(12) United States Patent
Kurozuka et al.

(10) Patent No.: US 7,872,952 B2
(45) Date of Patent: Jan. 18, 2011

(54) OPTICAL DISC DRIVE

(75) Inventors: Akira Kurozuka, Osaka (JP); Shin-ichi Kadowaki, Hyogo (JP); Joji Anzai, Osaka (JP); Osamu Kajino, Osaka (JP)

(73) Assignee: Panasonic Corporation, Osaka (JP)

( * ) Notice: Subject to any disclaimer, the term of this patent is extended or adjusted under 35 U.S.C. 154(b) by 811 days.

(21) Appl. No.: 11/576,482

(22) PCT Filed: Sep. 20, 2005

(86) PCT No.: PCT/JP2005/017302
§ 371 (c)(1),
(2), (4) Date: Apr. 2, 2007

(87) PCT Pub. No.: WO2006/038454
PCT Pub. Date: Apr. 13, 2006

(65) Prior Publication Data
US 2009/0073824 A1 Mar. 19, 2009

(30) Foreign Application Priority Data
Oct. 7, 2004 (JP) .............................. 2004-294777

(51) Int. Cl.
*G11B 7/00* (2006.01)
*G11B 7/135* (2006.01)
(52) U.S. Cl. ................ 369/44.23; 369/112.29
(58) Field of Classification Search ............... None
See application file for complete search history.

(56) References Cited

U.S. PATENT DOCUMENTS

| 5,790,493 | A | 8/1998 | Takeya et al. |
| 6,430,137 | B1 | 8/2002 | Saimi et al. |
| 6,934,226 | B2 | 8/2005 | Yasuda et al. |
| 2002/0172110 | A1 * | 11/2002 | Tateishi et al. ........... 369/44.32 |
| 2005/0152019 | A1 | 7/2005 | Mushika |

FOREIGN PATENT DOCUMENTS

| CN | 1380646 | 11/2002 |
| JO | 2000-155979 | 6/2000 |
| JP | 09-106617 | 4/1997 |
| JP | 11-328684 | 11/1999 |
| JP | 2002-288873 | 10/2002 |
| JP | 2003-016660 | 1/2003 |
| JP | 2004-295952 | 10/2004 |
| WO | 03/065103 | 8/2003 |
| WO | 2005/085125 | 9/2005 |

OTHER PUBLICATIONS

International Search Report for corresponding Application No. PCT/JP2005/017302 mailed Nov. 8, 2005.
Mark A. A. Neil et al., J. Opt. Soc. Am. A/vol. 17, No. 6; "New Modal Wave-Front Sensor: A Theoretical Analysis;" Jun. 2000; pp. 1098-1107 (cited in [0080], p. 43 of the description).
Chinese Office Action for corresponding Application No. 200580002976.1 dated Jun. 6, 2008, including partial English translation.

* cited by examiner

*Primary Examiner*—Christopher R Lamb
(74) *Attorney, Agent, or Firm*—Renner, Otto, Boisselle & Sklar, LLP

(57) ABSTRACT

An optical disk apparatus according to the present invention includes: a light emission section for emitting laser light; an optical system for irradiating the optical disk medium with the laser light; and an aberration control section for controlling aberration of the laser light. In one embodiment, the aberration control section repeatedly switches between a plurality of aberration setting states in a focus lock-in operation. In another embodiment, the aberration control section simultaneously sets a plurality of aberration setting states in a focus lock-in operation. As a result, a plurality of aberration setting states can be allowed to substantially coexist within a single optical system.

22 Claims, 11 Drawing Sheets

OPTICAL DISC DRIVE

TECHNICAL FIELD

The present invention relates to an apparatus for performing optical recording and/or reproduction of information, and in particular relates to an apparatus which corrects a spherical aberration that occurs in accordance with the thickness of a light transmitting layer when an information recording medium including a plurality of recording layers is irradiated with laser light.

BACKGROUND ART

Optical memory technology employing an optical disk medium with a pit pattern as a high-density and large-capacity information storage medium has been put to practical use while expanding its uses to digital audio disks, video disks, document file disks, and data file disks. Functions which are necessary for successfully carrying out information recording to an optical disk medium and information reproduction from an optical disk medium with a high reliability, by using fine-apertured laser light, are generally classified into: a converging function of forming a diffraction-limited light spot; a focal point control (focus servo) function and a tracking control (tracking servo) function of an optical system; and a pit signal (information signal) detection function.

In order to further increase the recording density of an optical disk medium, the numerical aperture NA of an objective lens which is mounted in an optical head has been increased and the wavelength λ of light from a light source has been reduced, whereby the spot diameter of light which is converged by the objective lens has been reduced. Moreover, in order to further increase the recording capacity of an optical disk medium, it has become common practice to provide the optical disk medium with a plurality of recording layers for recording information.

For example, under the CD (Compact Disc) standard, the numerical aperture NA of the objective lens is supposed to be 0.45 and the wavelength of light from the light source is supposed to be 780 nm. On the other hand, under the DVD (Digital Versatile Disc) standard, where higher recording density and larger capacity are intended, the numerical aperture NA is supposed to be 0.6 and the light wavelength is supposed to be 650 nm.

An aberration which occurs due to a tilt of an optical disk medium with respect to the optical axis increases as the light wavelength becomes shorter. Therefore, in order to obtain a good light spot while employing a shorter-wavelength light source, it is effective to reduce the base thickness (i.e., the distance from the light-entering surface of an optical disk medium to its recording layer) so as to cancel such aberration. Thus, while the base thickness is 1.2 mm in a CD, it is 0.6 mm in a DVD.

Furthermore, under the BD (Blu-ray Disc) standard employing blue laser light, the numerical aperture NA is supposed to be 0.85 and the base thickness is supposed to be 0.1 mm.

Referring to FIG. 9, a spherical aberration associated with base thickness will be described. FIG. 9 is a diagram schematically showing a spherical aberration associated with base thickness.

Laser light 911 which has been converged by an objective lens 910 is transmitted through a cover layer 903 of an optical disk medium 901, and converges at a focal point on a recording layer 902. Since the laser light 911 is refracted when traveling through the cover layer 903, as the thickness of the cover layer 903 changes, a discrepancy occurs between the focal point of the laser light 911 which has traveled near the central portion of the objective lens 910 and the focal point of the laser light 911 which has traveled near the outer periphery of the objective lens 910 (that is, a spherical aberration occurs). Such spherical aberration associated with base thickness is in proportion with the numerical aperture NA to the fourth power. Therefore, in order to prescribe a large numerical aperture NA of 0.85, as under the BD standard, a means for correcting spherical aberration is provided in the optical system.

Moreover, in order to increase the recording capacity per optical disk medium, a double-layered disk having two recording layers is also adopted under the DVD standard. Even in the case where the numerical aperture NA is to be increased, it is effective to adopt a double-layered disk structure in order to increase the recording capacity per optical disk medium.

A double-layered disk is structured so as to have, from the optical head-side, a base material, an L0 layer (first recording layer), an intermediate layer, an L1 layer (second recording layer), and a protection layer on the rear face. The base material and the intermediate layer are composed of a transparent medium such as resin. Since the intermediate layer exists between the L0 layer and the L1 layer, the thickness from the surface of the optical disk medium at the optical head side to the L1 layer is thicker than the thickness to the L0 layer, corresponding to the thickness of the intermediate layer. Since the magnitude of spherical aberration varies with the base thickness, the magnitude of spherical aberration changes when the focal point position of laser light is moved from the L0 layer to the L1 layer. However, under the DVD standard where the numerical aperture NA is 0.6, the amount of such change in spherical aberration will fall within the tolerable range, and therefore it is possible to carry out information recording/reproduction without performing aberration correction.

In the case where an objective lens having a numerical aperture NA as large as 0.8 or more is used in order to further enhance recording density, the spherical aberration associated with the thickness of the intermediate layer is no longer negligible. In other words, without spherical aberration correction, it is impossible to perform information recording/reproduction for both recording layers with a single optical head. When increasing the numerical aperture NA to be 0.8 or more, as described above, correction of spherical aberration is necessary even in the case of performing information recording/reproduction for a single recording layer. Naturally, in the case of performing information recording/reproduction for an optical disk medium having two or more recording layers, too, it is necessary to perform an optimal spherical aberration correction for each recording layer, thus to eliminate the spherical aberration associated with the thickness of the intermediate layer.

Therefore, when moving the focal point of laser light from one recording layer to another recording layer (hereinafter referred to as an "interlayer jump") along the optical axis direction of the objective lens, the state of aberration correction must also be changed.

For example, Patent Document 1 discloses an apparatus which sets the aberration of laser light so that a spherical aberration which will occur when the focal point rests on a recording layer that is to be reached after a focus jump (hereinafter referred to as the "target recording layer") will be corrected to some extent, this being performed before beginning an interlayer jump in a manner not allowing the current focus servo to fail. The reason why the correction can only be done to some extent is that, before beginning an interlayer jump, if the aberration of the laser light is previously set so that the spherical aberration to occur when the focal point rests on the target recording layer will be well-corrected, then the current focus servo will fail.

In order to employ a common optical head to perform information recording/reproduction for optical disk media with different laser light wavelengths and base thicknesses, e.g., CDs, DVDs, BDs, it is necessary to determine the type of the optical disk medium before a recording/reproduction operation.

Patent Document 2 discloses a medium determination method which supports CDs and DVDs. According to this method, based on whether a peak value of the focus error signal has exceeded a threshold value or not, it is determined whether an optical disk medium that is mounted in the apparatus is a DVD or a CD. When an operation of determining the type of the optical disk medium is performed in a state which is suitable for DVDS, if the mounted optical disk medium is determined to be a DVD, focus servo control is performed based on the peak values of the focus error signal as it is. If the mounted optical disk medium is a CD, the lens is again moved with a moving velocity corresponding to a CD linear velocity, and focus servo control is performed based on the peak values of the detected focus error signal.

Patent Document 3 discloses an apparatus which corrects spherical aberration by, using a micromirror array as an aberration correcting means, tilting the angle of each micromirror so as to adjust the angle of radiation of light entering the objective lens. Moreover, Patent Document 3 discloses a method for creating a plurality of focal points by adjusting the tilt angles of the micromirror array.

[Patent Document 1] Japanese Laid-Open Patent Publication No. 2003-16660

[Patent Document 2] Japanese Laid-Open Patent Publication No. 9-106617

[Patent Document 3] Japanese Laid-Open Patent Publication No. 2002-288873

DISCLOSURE OF INVENTION

Problems to be Solved by the Invention

However, the aforementioned conventional techniques have the following problems.

In the example disclosed in Patent Document 1, laser light aberration is set so that the spherical aberration to occur when the focal point rests on the target recording layer will be corrected to some extent, this being performed before beginning an interlayer jump in a manner not allowing the current focus servo to fail. Since this state is not a state where the spherical aberration corresponding to the target recording layer would be sufficiently corrected, it is difficult to securely perform a focus lock-in operation when the focal point of the laser light has reached the target recording layer, and the control is likely to become unstable.

Moreover, this aberration setting state of laser light is optimum for neither the recording layer which is being tracked by the light spot before the interlayer jump nor the target recording layer. Therefore, if a force is applied on the objective lens due to a disturbance during the interlayer jump, focus will not be locked-in on either recording layer, so that the objective lens may collide with the optical disk medium.

In an optical disk medium having three or more recording layers, in order to make a jump between recording layers which are distant from each other, it is necessary to make consecutive jumps between adjoining recording layers, so that a long time will be required before the light spot reaches the target recording layer.

In the example disclosed in Patent Document 2, when an operation of determining the type of the optical disk medium is performed in a state which is suitable for DVDs, if the mounted optical disk medium is determined not to be a DVD, a further determination operation and a focus lock-in operation must be performed again, thus resulting in the apparatus having a long boot time.

Patent Document 3 fails to disclose any operation at an interlayer jump or any operation of determining the type of an optical disk medium.

The present invention has been made in view of the aforementioned problems, and an objective thereof is to, in the case of performing information recording/reproduction for a multi-layered optical disk medium having two or more recording layers, realize stable and quick interlayer jumps.

A further objective of the present invention is to realize a quick boot of the apparatus by efficiently distinguishing between a plurality of types of optical disk media whose base thicknesses and suitable laser light wavelengths are different.

Means for Solving the Problems

An apparatus according to the present invention is an apparatus for performing at least one of data recording to an optical disk medium and data reproduction from the optical disk medium, comprising: a light emission section for emitting laser light; an optical system for irradiating the optical disk medium with the laser light; and an aberration control section for controlling aberration of the laser light, characterized in that the aberration control section repeatedly switches between a plurality of aberration setting states in a focus lock-in operation.

In one embodiment, the optical system includes an objective lens; and the aberration control section alternately switches between the plurality of aberration setting states with a frequency which is higher than a focus control band of the objective lens.

An apparatus according to the present invention is an apparatus for performing at least one of data recording to an optical disk medium and data reproduction from the optical disk medium, comprising: a light emission section for emitting laser light; an optical system for irradiating the optical disk medium with the laser light; and an aberration control section for controlling aberration of the laser light, characterized in that the aberration control section simultaneously sets a plurality of aberration setting states in a focus lock-in operation.

In one embodiment, after simultaneously setting the plurality of aberration setting states, the aberration control section changes the simultaneously-set plurality of aberration setting states into one aberration setting state.

In one embodiment, the plurality of aberration setting states include a first aberration setting state and a second aberration setting state; the optical disk medium includes a first recording layer and a second recording layer; and the first aberration setting state corresponds to the first recording layer, and the second aberration setting state corresponds to the second recording layer.

In one embodiment, the first aberration setting state is a state where an aberration to occur when the focal point of laser light rests on the first recording layer is corrected; and the second aberration setting state is a state where an aberration to occur when the focal point of laser light rests on the second recording layer is corrected.

In one embodiment, the optical system includes an objective lens; the apparatus further comprises an actuator for driving the objective lens; and with a focus servo operation being kept ON, the actuator moves the focal point of laser light position from the first recording layer to the second recording layer.

In one embodiment, the apparatus is an apparatus for performing at least one of data recording to a plurality of types of optical disk media and data reproduction from the plurality of types of optical disk media; the light emission section emits a plurality of types of laser light having different wavelengths from one another; each of the plurality of types of laser light corresponds to one of the plurality of types of optical disk media; and each of the plurality of aberration setting states corresponds to one of the plurality of types of laser light.

In one embodiment, each of the plurality of aberration setting states is a state where an aberration to occur when the focal point of the corresponding laser light rests on a recording layer of a corresponding one of the plurality of types of optical disk media is corrected.

In one embodiment, the optical system emits the plurality of types of laser light toward an optical disk medium which is mounted in the apparatus, and the apparatus further comprises: at least one photodetection section for receiving reflected light corresponding to the plurality of types of laser light and outputting an electrical signal which is in accordance with the received reflected light; a signal detection section for detecting a focus error signal from the electrical signal; and a determination section for, based on the focus error signal, determining a type of the optical disk medium which is mounted in the apparatus.

In one embodiment, the light emission section emits a plurality of types of laser light having different wavelengths from one another; each of the plurality of aberration setting states corresponds to one of the plurality of types of laser light; the apparatus further comprises a plurality of photodetection sections; each of the plurality of photodetection sections receives reflected light corresponding to one of the plurality of types of laser light, and outputs an electrical signal which is in accordance with the received reflected light; the apparatus further comprises a signal detection section for detecting a focus error signal from the electrical signals; and in synchronization with a timing of alternately switching between the plurality of aberration setting states, the signal detection section switches the electrical signal to be used for detecting the focus error signal among the electrical signals which are output from the plurality of photodetection sections.

In one embodiment, the aberration control section includes: an aberration correction section for correcting aberration of the laser light; and a controller for controlling the aberration correction section, wherein, the controller corrects the aberration by controlling the aberration correction section so as to reduce the aberration.

In one embodiment, the aberration correction section is a deformable mirror; and the controller corrects the aberration by setting a shape of the deformable mirror so as to reduce the aberration.

In one embodiment, the deformable mirror is a micromirror array including a plurality of microactuators each having a light reflecting surface; and the aberration control section sets the shape of the deformable mirror by driving the plurality of microactuators.

A controller according to the present invention is a controller for, when mounted in an optical disk apparatus for performing at least one of data recording to an optical disk medium and data reproduction from the optical disk medium, controlling aberration of laser light, the optical disk apparatus including: a light emission section for emitting the laser light; an optical system for irradiating the optical disk medium with the laser light; and an aberration correction section for correcting aberration of the laser light, characterized in that the controller controls the aberration correction section so as to repeatedly switch between a plurality of aberration setting states in a focus lock-in operation.

One embodiment alternately switches between the plurality of aberration setting states with a frequency which is higher than a focus control band of an objective lens in the optical system.

A controller according to the present invention is a controller for, when mounted in an optical disk apparatus for performing at least one of data recording to an optical disk medium and data reproduction from the optical disk medium, controlling aberration of laser light, the optical disk apparatus including: a light emission section for emitting the laser light; an optical system for irradiating the optical disk medium with the laser light; and an aberration correction section for correcting aberration of the laser light, characterized in that the controller simultaneously sets a plurality of aberration setting states in the aberration correction section in a focus lock-in operation.

In one embodiment, after simultaneously setting the plurality of aberration setting states, the simultaneously-set plurality of aberration setting states are changed into one aberration setting state.

In one embodiment, the plurality of aberration setting states include a first aberration setting state and a second aberration setting state; the optical disk medium includes a first recording layer and a second recording layer; and the first aberration setting state corresponds to the first recording layer, and the second aberration setting state corresponds to the second recording layer.

In one embodiment, the first aberration setting state is a state where an aberration to occur when the focal point of laser light rests on the first recording layer is corrected; and the second aberration setting state is a state where an aberration to occur when the focal point of laser light rests on the second recording layer is corrected.

In one embodiment, the optical disk apparatus is an apparatus for performing at least one of data recording to a plurality of types of optical disk media and data reproduction from the plurality of types of optical disk media; the light emission section emits a plurality of types of laser light having different wavelengths from one another; each of the plurality of types of laser light corresponds to one of the plurality of types of optical disk media; and each of the plurality of aberration setting states corresponds to one of the plurality of types of laser light.

In one embodiment, each of the plurality of aberration setting states is a state where an aberration to occur when the focal point of the corresponding laser light rests on a recording layer of a corresponding one of the plurality of types of optical disk media is corrected.

In one embodiment, the optical system emits the plurality of types of laser light toward an optical disk medium which is mounted in the optical disk apparatus; and the optical disk apparatus includes at least one photodetection section for receiving reflected light corresponding to the plurality of types of laser light, and outputting an electrical signal which is in accordance with the received reflected light, the controller comprising: a signal detection section for detecting a focus error signal from the electrical signal; and a determination section for, based on the focus error signal, determining a type of the optical disk medium which is mounted in the optical disk apparatus.

In one embodiment, the light emission section emits a plurality of types of laser light having different wavelength from one another; each of the plurality of aberration setting states corresponds to one of the plurality of types of laser light; the optical disk apparatus further includes a plurality of photodetection sections; each of the plurality of photodetection sections receives reflected light corresponding to one of the plurality of types of laser light, and outputs an electrical signal which is in accordance with the received reflected light; the controller comprises a signal detection section for detecting a focus error signal from the electrical signals, in synchronization with a timing of alternately switching between the plurality of aberration setting states, the signal detection section switches the electrical signal to be used for detecting the focus error signal among the electrical signals which are output from the plurality of photodetection sections.

In one embodiment, the aberration correction section includes a deformable mirror; and the controller corrects the aberration by setting a shape of the deformable mirror so as to reduce the aberration.

In one embodiment, the deformable mirror is a micromirror array including a plurality of microactuators each having a light reflecting surface; and the controller sets the shape of the deformable mirror by driving the plurality of microactuators.

A method according to the present invention is a method for, in an optical disk apparatus for performing at least one of data recording to an optical disk medium and data reproduction from the optical disk medium, controlling aberration of laser light, the optical disk apparatus including: a light emission section for emitting the laser light; an optical system for irradiating the optical disk medium with the laser light; and an aberration correction section for correcting aberration of the laser light, characterized in that the method comprises a step of controlling the aberration correction section so as to repeatedly switch between a plurality of aberration setting states in a focus lock-in operation.

A method according to the present invention is a method for, in an optical disk apparatus for performing at least one of data recording to an optical disk medium and data reproduction from the optical disk medium, controlling aberration of laser light, the optical disk apparatus including: a light emission section for emitting the laser light; an optical system for irradiating the optical disk medium with the laser light; and an aberration correction section for correcting aberration of the laser light, characterized in that the method comprises a step of simultaneously setting a plurality of aberration setting states in the aberration correction section in a focus lock-in operation.

A program according to the present invention is a program for causing an optical disk apparatus for performing at least one of data recording to an optical disk medium and data reproduction from the optical disk medium to execute a process of controlling aberration of laser light, the optical disk apparatus including: a light emission section for emitting the laser light; an optical system for irradiating the optical disk medium with the laser light; and an aberration correction section for correcting aberration of the laser light, characterized in that the controlling process comprises a step of controlling the aberration correction section so as to repeatedly switch between a plurality of aberration setting states in a focus lock-in operation.

A program according to the present invention is a program for causing an optical disk apparatus for performing at least one of data recording to an optical disk medium and data reproduction from the optical disk medium to execute a process of controlling aberration of laser light, the optical disk apparatus including: a light emission section for emitting the laser light; an optical system for irradiating the optical disk medium with the laser light; and an aberration correction section for correcting aberration of the laser light, characterized in that the controlling process comprises a step of simultaneously setting a plurality of aberration setting states in the aberration correction section in a focus lock-in operation.

EFFECTS OF THE INVENTION

According to the present invention, by repeatedly switch between a plurality of aberration setting states in a focus lock-in operation, a plurality of aberration setting states can be allowed to substantially coexist within a single optical system. In another embodiment, by simultaneously setting a plurality of aberration setting states in focus lock-in operation, a plurality of aberration setting states can be allowed to coexist within a single optical system. Based on these features, in the case of performing information recording/reproduction for a multi-layered optical disk medium, stable and quick interlayer jumps can be performed. Moreover, the type of an optical disk medium can be efficiently determined, and the apparatus can be allowed to boot quickly.

Figure 1A:
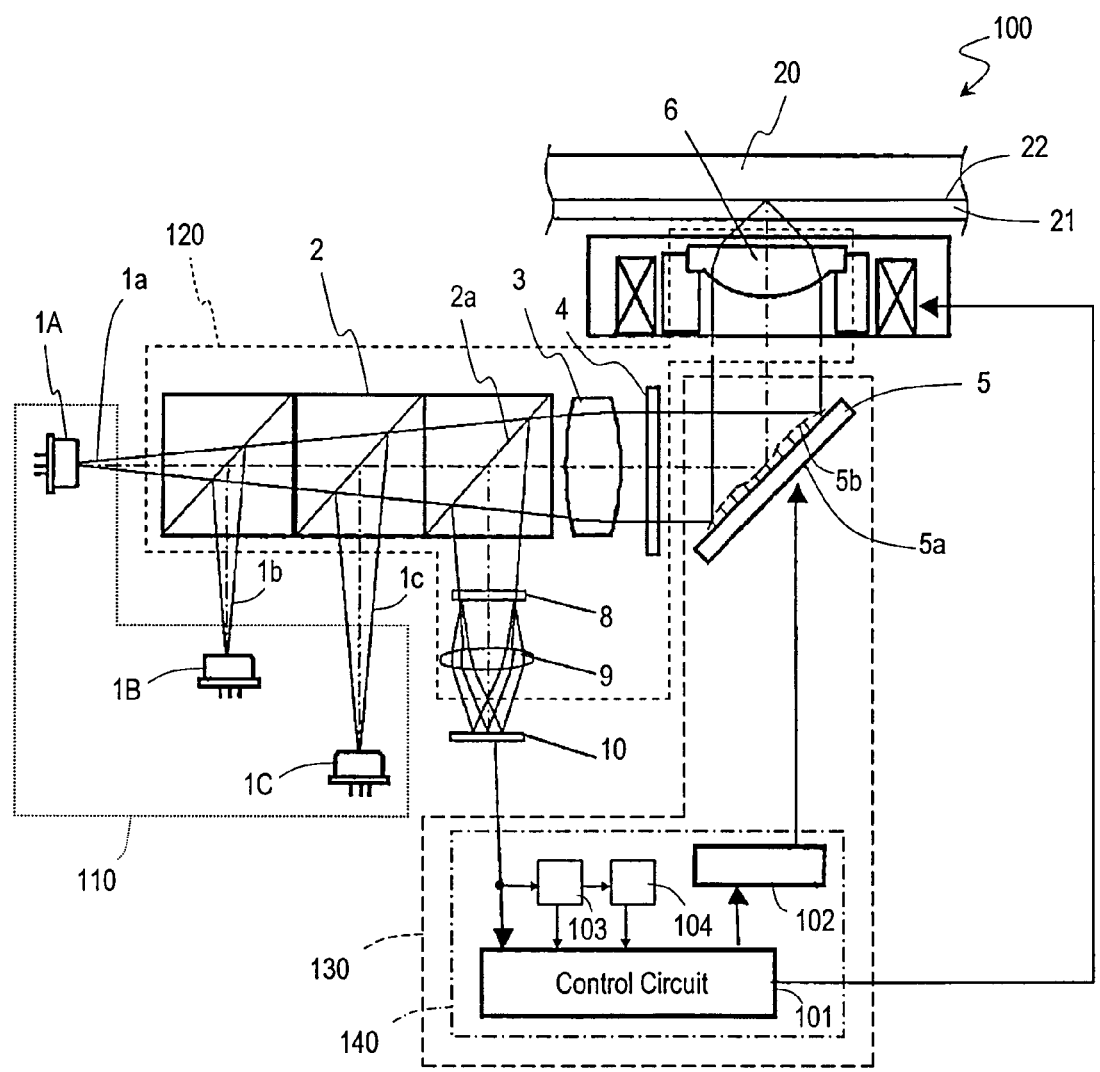
FIG. 1A A diagram schematically showing an optical disk apparatus according to an embodiment of the present invention FIG. 1B An exploded perspective view showing a microactuator according to an embodiment of the present invention FIG. 1C An exploded perspective view showing an aberration correction section according to an embodiment of the present invention FIG. 2A A diagram showing an aberration according to an embodiment of the present invention FIG. 2B A diagram showing an aberration according to an embodiment of the present invention FIG. 2C A diagram showing a wavefront pattern according to an embodiment of the present invention FIG. 2D A diagram showing a wavefront pattern according to an embodiment of the present invention FIG. 3 A flowchart showing a disk determination operation according to an embodiment of the present invention FIG. 4 A diagram showing a relationship between beam spot positions and a focus error signal according to an embodiment of the present invention FIG. 5 A flowchart showing an interlayer jump operation according to an embodiment of the present invention FIG. 6 A diagram showing a relationship between beam spot positions and a focus error signal according to an embodiment of the present invention FIG. 7 A plan view showing an aberration correction section which is split into a plurality of regions according to an embodiment of the present invention FIG. 8 A plan view showing an aberration correction section which is split into two regions according to an embodiment of the present invention FIG. 9 A diagram schematically showing a spherical aberration associated with base thickness

DESCRIPTION OF REFERENCE NUMERALS 1A, 1B, 1C laser light source dichroic prism
3 collimating lens
4 ¼ wavelength plate
5 aberration correction section
5a substrate
5b microactuator
6 objective lens
7 lens actuator
8 hologram
9 detection lens
10 photodetector
20 optical disk medium
21 cover layer
22 recording layer
100 optical disk apparatus
101 control circuit
102 wavefront pattern generator

BEST MODE FOR CARRYING OUT THE INVENTION

Hereinafter, an embodiment according to the present invention will be described with reference to the figures.

Embodiment 1

First, with reference to FIG. 1A, an optical disk apparatus 100 according to the present embodiment will be described. FIG. 1A is a diagram schematically showing the optical disk apparatus 100. The optical disk apparatus 100 is an apparatus which executes at least one of data recording to a plurality of types of optical disk media 20 and data reproduction from the plurality of types of optical disk media 20.

The optical disk apparatus 100 includes: a light emission section 110 for emitting laser light; an optical system 120 for irradiating the optical disk medium 20 with the laser light; and an aberration control section 130 for controlling the aberration of the laser light.

The light emission section 110 includes: a laser light source 1A for emitting laser light 1a; a laser light source 1B for emitting laser light 1b; and a laser light source 1C for emitting laser light 1c. The wavelengths of the laser light 1a to 1c are different from one another. The optical system 120 includes a dichroic prism 2, an collimating lens 3, a ¼ wavelength plate 4, an objective lens 6, a hologram 8, and a detection lens 9. The dichroic prism 2 includes a polarization beam splitter 2a. The optical disk apparatus 100 further includes a lens actuator 7 for driving the objective lens 6. The aberration control section 130 includes an aberration correction section 5 for correcting the aberration of the laser light 1a to 1c, and a controller 140 for controlling the operation of the aberration correction section 5.

The laser light 1a to 1c which is emitted from the laser light sources 1A to 1C is led through the dichroic prism 2, the collimating lens 3, and the ¼ wavelength plate 4, so as to be reflected from the aberration correction section 5 and converged by the objective lens 6. The converged laser light 1a to 1c is transmitted through a cover layer 21 of the optical disk medium 20 to form a spot on a recording layer 22. The reflected light obtained from the laser light 1a to 1c being reflected from the recording layer 22 follows an opposite path, and is deflected by the polarization beam splitter 2a toward the hologram 8 and the detection lens 9. The optical disk apparatus 100 includes a photodetector 10 for receiving the reflected light having passed through the detection lens 9, and the photodetector 10 outputs an electrical signal which is in accordance with the amount of received light.

The controller 140 includes: a signal detection section 103 for detecting a focus error signal and a tracking error signal from the electrical signal which is output from the photodetector 10; a determination section 104 for determining the type of the optical disk medium 20 which is mounted in the optical disk apparatus 100 based on the detected focus error signal; a control circuit 101 for controlling the operation of the lens actuator 7; and a wavefront pattern generator 102 for generating a wavefront pattern to be set in the aberration correction section 5. The control circuit 101 subjects the focus error signal and the tracking error signal to calculations to generate a driving signal for driving the lens actuator 7, and performs focusing and tracking control for the objective lens 6.

The laser light 1a to 1c each has a wavelength which is suitable for a corresponding one of the BD, DVD, and CD, for example, and is selectively used in accordance with the type of the mounted optical disk medium 20. Spherical aberration occurs because of the base thickness (i.e., distance from the light-entering surface to the recording layer) differing depending on the type of the optical disk medium 20, and because of chromatic aberration and the like occurring in the optical system 120. The wavefront pattern generator 102 corrects the spherical aberration by setting a wavefront pattern for canceling this spherical aberration to the aberration correction section 5. As a result, a beam spot which is suitable for each type of optical disk medium 20 is formed.

The aberration correction section 5 is a micromirror array having a plurality of microactuators 5b, and functions as a deformable mirror. The microactuators 5b are arranged in a two-dimensional manner on the substrate 5a, each having a light reflecting surface. Each microactuator 5b is independently controlled with respect to its up/down positions and tilt relative to the substrate 5a, thus being able to form an arbitrary wavefront. Such a micromirror array is formed on a silicon substrate through a micromachining technique of a semiconductor fabrication process. A microactuator disclosed in WO2003/065103 is suitable, for example. A microactuator disclosed in PCT/JP2005/003533 (which claims priority based on Japanese Patent Application No. 2004-063518) is also suitable.

Figure 1B:
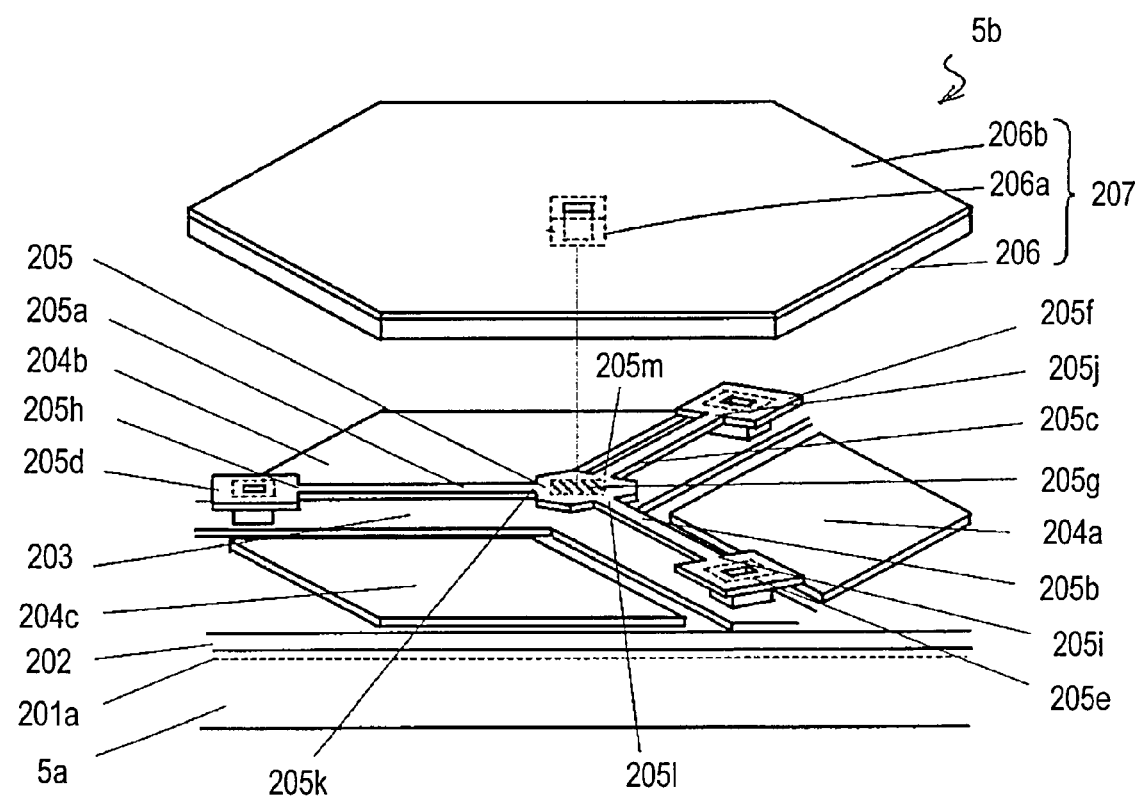
Figure 1C:
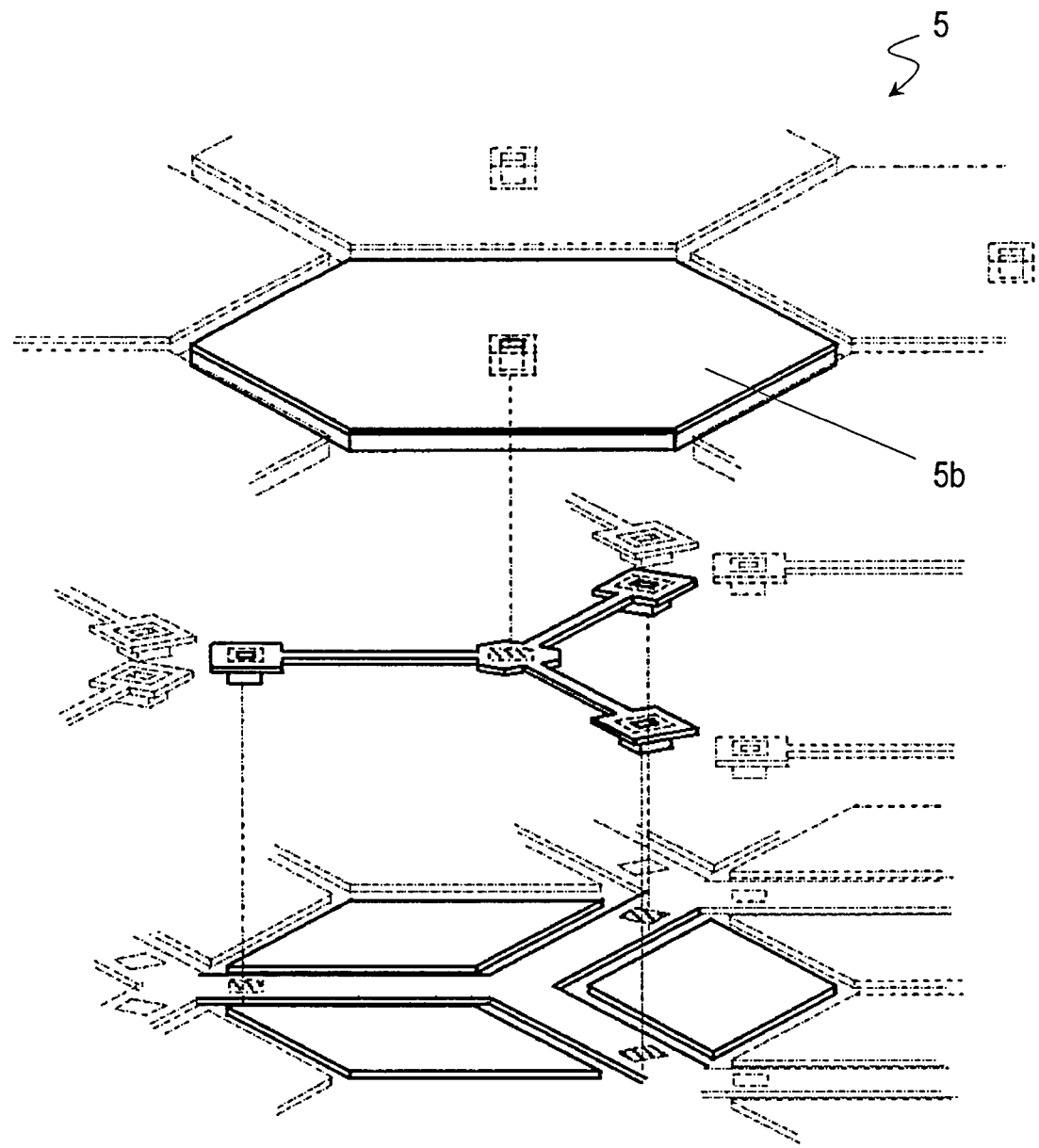

Referring to FIG. 1B and FIG. 1C, the microactuators 5b will be described more specifically. First, FIG. 1B is referred to. FIG. 1B is an exploded perspective view showing a microactuator 5b.

The microactuator 5b includes a substrate 5a, a movable section 207, an elastic supporting member 205, and stationary electrodes 204a, 204b and 204c. The microactuator 5b is produced by using an MEMS technique, for example. The substrate 5a is a silicon substrate, for example. On the substrate 5a, a driving circuit 201a is provided, with an insulating layer 202 being provided on the driving circuit 201a. On the insulating layer 202, the stationary electrodes 204a to 204c and a ground wiring portion 203 are provided. The movable section 207 is capable of making displacements relative to the substrate 5a. The elastic supporting member 205 is elastic, and supports the movable section 207 so as to enable a displacement of the movable section 207 in a direction perpendicular to the plane direction of the substrate 5a, as well as a tilt of the movable section 207 relative to the substrate 5a. Each of the stationary electrodes 204a to 204c functions as a driving section for driving the movable section 207 in a direction perpendicular to the plane direction of the substrate 5a. Each of the stationary electrodes 204a to 204c is connected to the driving circuit 201a through a via (not shown) which is formed in the insulating layer 202. The driving circuit 201a is able to independently apply a driving voltage in a predetermined voltage range (e.g., 0 to 30V) to each of the stationary electrodes 204a to 204c. The driving voltage may be prescribed in multiple steps of values of e.g. 10 bits.

The elastic supporting member 205 includes three elastic beams 205a to 205c, fixture portions 205d to 205f for affixing the elastic beams 205a to 205c to the substrate 5a, and a support portion 205g for supporting the movable section 207. The elastic beams 205a to 205c are connected to the ground wiring portion 203. Among the end portions of the elastic beams 205a to 205c, those end portions which are connected to the fixture portions 205d to 205f will be referred to as stationary ends 205h to 205j, whereas those end portions which are connected to the support portion 205g will be referred to as movable ends 205k to 205m.

The support portion 205g is connected to a protrusion 206a which is provided in a central portion of the movable electrode 206. The three elastic beams 205a to 205c are linked to one another via the support portion 205g.

The movable electrode 206 has a generally regular hexagonal shape. The upper face of the movable electrode 206 constitutes a micromirror section 206b, which is a light reflecting surface. In order to further enhance the light reflection efficiency, gold or a dielectric multilayer film, etc., may be coated on the upper face of the movable electrode 206 to form the micromirror section 206b. The movable electrode 206 is connected to the driving circuit 201a via the elastic supporting member 205 and the ground wiring portion 203, and is maintained at the ground potential.

The movable electrode 206 opposes the three stationary electrodes 204a to 204c via a gap. When a potential difference(s) emerges between the movable electrode 206 and the stationary electrodes 204a to 204c, an electrostatic force(s) occurs between the movable electrode 206 and the stationary electrodes 204a to 204c. These electrostatic forces are utilized as driving forces for driving the movable section 207. When the movable section 207 is displaced with these driving forces, the elastic supporting member 205 deforms elastically, and the posture of the movable section 207 is determined based on the balance between the elastic restoring force of the elastic supporting member 205 and the driving forces. By controlling the magnitude of the driving force generated by each of the stationary electrodes 204a to 204c, it becomes possible to control the amount of displacement of the movable section 207 in a direction perpendicular to the substrate 5a and the amount of its tilt relative to the substrate 5a. If equal driving voltages are set for the stationary electrodes 204a to 204c, the movable section 207 will make a vertical displacement in a direction such that the entire movable section 207 (including the central portion of the movable section 207) approaches the substrate 5a, while making hardly any tilt. By making these driving voltages different from one another, the movable section 207 will tilt in a desired direction. Herein, the tilt relative to the substrate 5a is a tilt around two tilt axes which are parallel to the plane direction of the substrate 5a and are perpendicular to each other.

A micromirror array is formed by arranging a plurality of unit cells, where each unit cell is such a microactuator 5b as above. FIG. 1C is an exploded perspective view showing an aberration correction section 5 as a micromirror array. The movable sections 207, the elastic supporting members 205, and the stationary electrodes 204a to 204c comprised in the plurality of microactuators 5b are provided on a single substrate 5a, such that the plurality of microactuators 5b share the single substrate 5a. Each microactuator 5b is independently controlled with respect to its up/down positions and tilt relative to the substrate 5a, thus forming an arbitrary wavefront pattern. As a result, aberration can be corrected.

In the case where the optical disk medium 20 includes a plurality of recording layers, the base thickness differs depending on the selected recording layer, even within the same optical disk medium 20. Therefore, the aberration correction section 5 is driven in accordance with the selected recording layer to correct aberration.

Figure 2A:
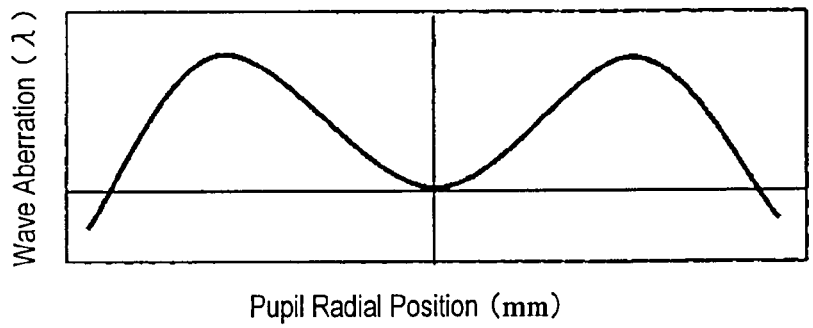
Figure 2B:
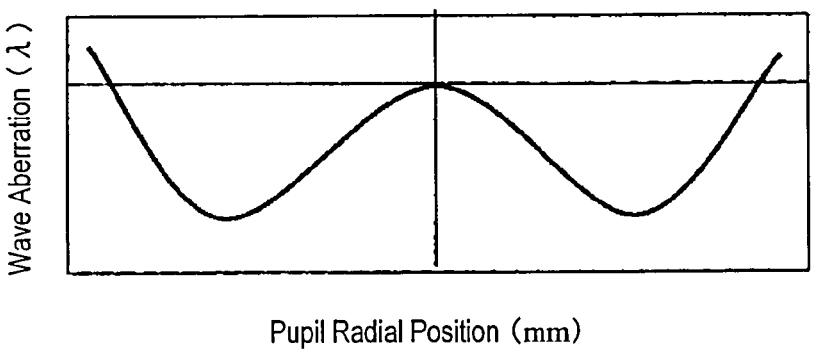
Figure 2C:
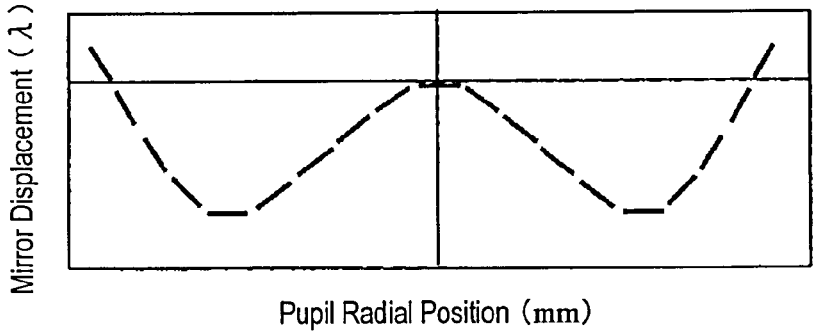
Figure 2D:
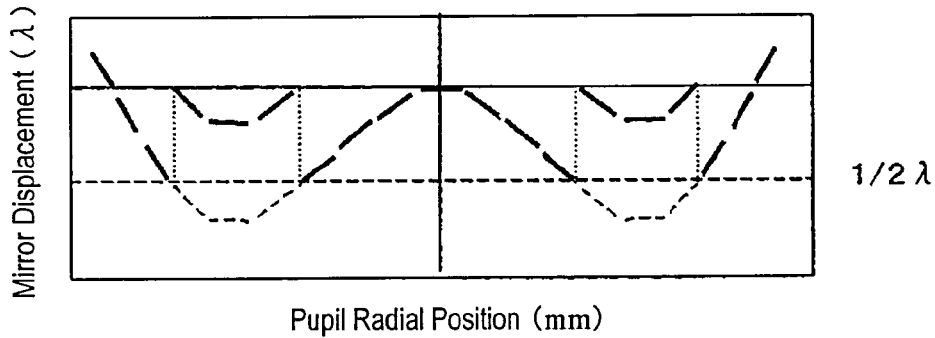

Referring to FIG. 2A to FIG. 2D, aberration correction by the aberration correction section 5 will be described. FIG. 2A and FIG. 2B show aberrations, where the horizontal axis represents normalized pupil radial position (mm) and the vertical axis represents wave aberration ($\lambda$). The sign and magnitude of the aberration depend on how much the base thickness varies from a reference thickness at which the aberration is minimum. FIG. 2C and FIG. 2D show wavefront patterns of the aberration correction section 5, where the horizontal axis represents normalize pupil radial position (mm) and the vertical axis represents mirror displacement ($\lambda$).

For instance, a case will be discussed where an objective lens for BD having a numerical aperture NA=0.85 is used, and the optical system and the objective lens are designed so that the aberration becomes minimum at an intermediate point between the first recording layer and the second recording layer of a BD. In this case, if the focal point (i.e., beam spot) is set at the first recording layer, for example, an aberration as shown in FIG. 2A will occur.

In order to correct the aberration shown in FIG. 2A, a wave aberration for canceling the aberration shown in FIG. 2A may be imparted in the optical path. For example, a wave aberration as shown in FIG. 2B may be imparted in the optical path, and, by controlling the tilt and up/down positions of each microactuator 5b of the aberration correction section 5, a wavefront pattern as shown in FIG. 2C, which approximates the wave aberration shown in FIG. 2B, is formed. The approximation error of the wavefront to occur at this time is determined by the beam diameter and the number of divisions made in the mirror (i.e., the number of microactuators 5b), such that the approximation error decreases as the number of divisions increases. However, since the amount of control data will become enormous as the number of microactuator 5b increases, a minimum number of divisions in the mirror can be determined so that the aberration is restrained within a range which is tolerated by the recording/reproduction system, e.g., the optical disk apparatus 100.

Moreover, as shown in FIG. 2D, at any pupil radial position where the wave aberration exceeds $(1/2)\lambda$, even if the mirror displacement is shifted by $(1/2)\lambda$, it will still be in the same phase as that shown in FIG. 2C. Therefore, it suffices if the maximum displacement amount of the mirror is $(1/2)\lambda$ or more. In the case where the laser light enters the optical disk surface at 45°, at any pupil radial position where the wave aberration exceeds $(\sqrt{2}/2)\lambda$, it will be in the same phase regardless of whether the mirror displacement is shifted by $(\sqrt{2}/2)\lambda$ or not. Therefore, in this case, it suffices if the maximum displacement amount of the mirror is $(\sqrt{2}/2)\lambda$ or more.

Any arbitrary wavefront shape can be prescribed by setting an appropriate number of divisions in the mirror. For example, when correcting a spherical aberration of 2 $\lambda$RMS, the number of divisions which is necessary for keeping the approximation error at 50 m$\lambda$ or less is a number of divisions such that the length of the beam diameter can be divided into twenty portions. Assuming that the beam diameter is $\phi$ 2 mm, the light reflecting surface (i.e., micromirror) of each microactuator 5b has a width of about 100 µm. In this case, the aberration correction section 5 includes about 20×20 micromirrors each having a width of 100 μm.

The wavefront pattern which ensures optimum aberration correction differs depending on the type of optical disk medium, and, in the case of an optical disk medium including a plurality of recording layers, depending on the recording layer. A wavefront pattern for performing optimum aberration correction in accordance with each situation is previously stored in the wavefront pattern generator 102, in the form of driving data for each microactuator 5b. By driving the respective microactuators 5b, the wavefront pattern generator 102 changes the shape of the micromirror array to form a wavefront pattern, thus performing an aberration correction (i.e., reduces aberration).

Note that, in order to obtain an even more accurate correction, a wavefront sensor for detecting wavefront information may be provided on the photodetector 10, and the aberration correction section 5 may be controlled in accordance with the detected wavefront information. As the wavefront sensor, a Shack-Hartmann type wavefront sensor or a modal-type wavefront sensor is used. A modal-type wavefront sensor is disclosed in M. A. A. Neil, M. J. Booth, and T. Wilson, "New modal wave-front sensor: a theoretical analysis," J. Opt. Soc. Am. A/Vol. 17, No. 6, pp. 1098-1107 (2000). Alternatively, any other aberration detection method such as that disclosed in Japanese Laid-Open Patent Publication No. 2000-155979 may be employed.

Moreover, learning may be performed with respect to the fluctuations from optical disk medium to optical disk medium, thus adjusting the amount of correction.

Hereinafter, the operation of the optical disk apparatus 100 will be described more specifically.

In the present embodiment, the wavefront pattern generator 102 drives the aberration correction section 5 so as to set a plurality of wavefront patterns while repeatedly switching between them rapidly (hereinafter referred to as time-division driving). Through this time-division driving, by using a single aberration correction section 5, it becomes possible to allow a plurality of wavefront patterns for correcting aberrations which differ depending on the type and base thickness of the optical disk medium 20 to substantially coexist.

The microactuators 5b can be rapidly driven because their movable sections are minute. For example, when the aforementioned 100 μm-wide micromirrors and a supporting system are formed of Al and subjected to electrostatic driving, each movable section will have a mass M of 4×E−11 kg, and a moment of inertia J of 6×E−16 kg·m2. Thus, the mass M and the moment of inertia J will be very small.

A first order resonant frequency f0z of translation is expressed as $f0z=1/2\pi\times\sqrt{(Kz/M)}$, whereas a first order resonant frequency f0r of rotation is expressed as $f0r=1/2\pi\times\sqrt{(Kr/J)}$. By appropriately designing the spring moduli Kz and Kr to design the microactuator 5b so that a necessary displacement will be obtained at a predetermined voltage, f0z and f0r can be prescribed to values of 8 to 10 kHz or more.

By driving the aberration correction section 5 so as to set a plurality of wavefront patterns while repeatedly switching between them, at a frequency which is sufficiently higher than the control band of the servo system of the objective lens 6, e.g., focus control band, a stable servo control can be maintained, whereby the objective lens 6 will track the optical disk medium 20.

Figure 3:
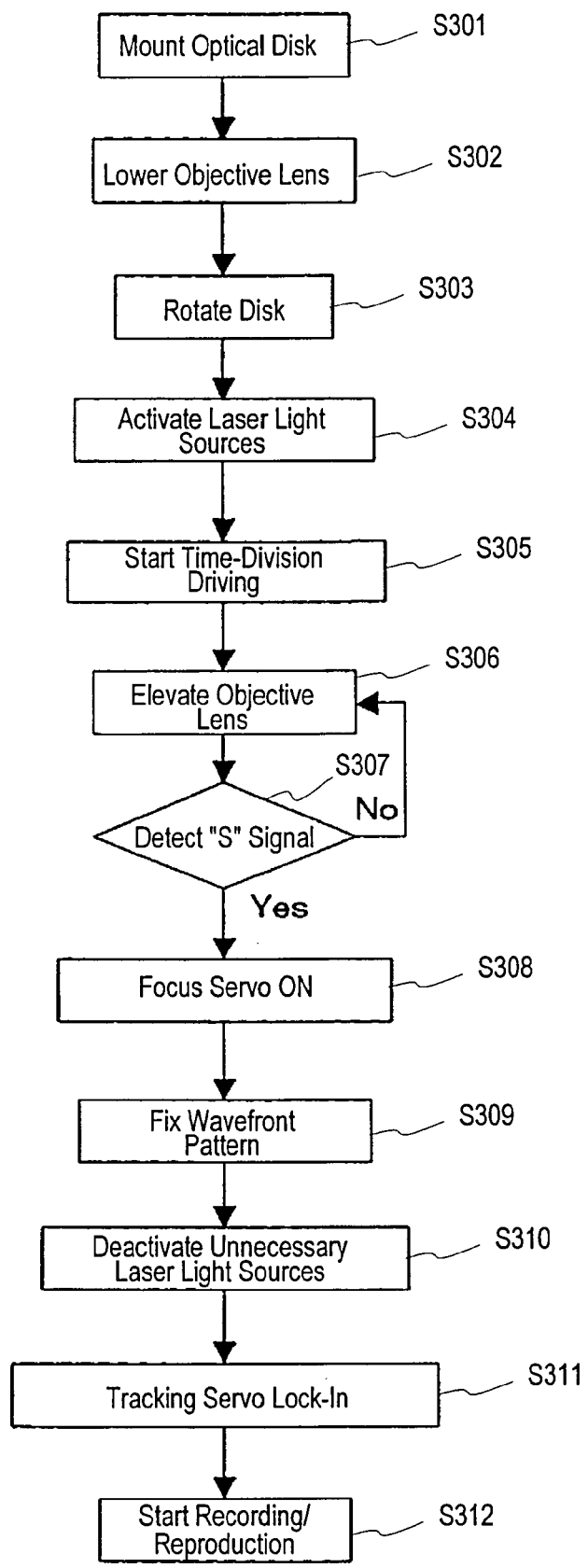
Figure 4:
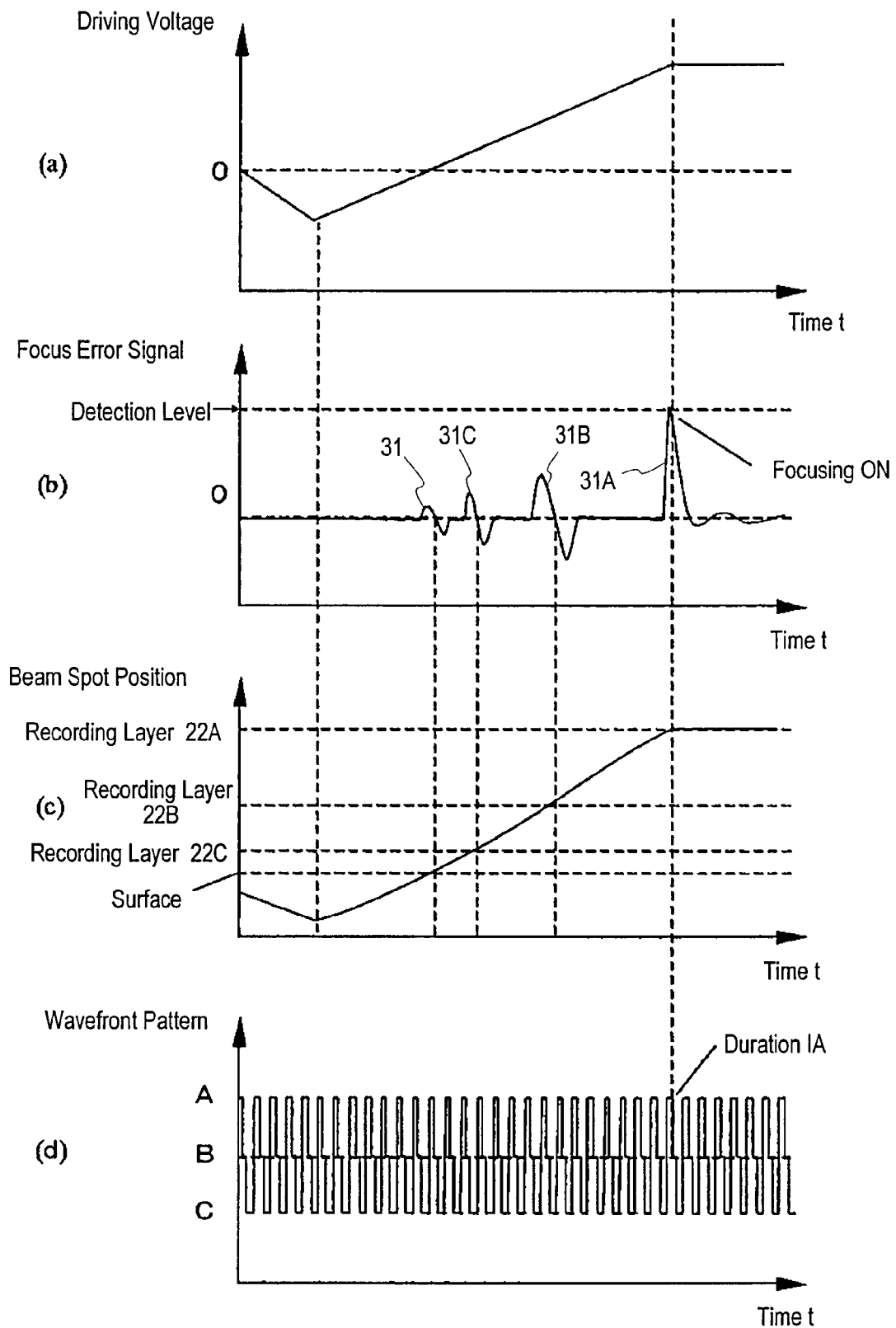

Referring to FIG. 3 and FIG. 4, an operation of determining the type of an optical disk medium by using time-division driving (hereinafter referred to as disk determination operation) will be described. FIG. 3 is a flowchart showing a disk determination operation.

When the optical disk medium 20 is mounted, the optical disk apparatus 100 performs a disk determination operation while also performing a focus lock-in operation. A focus lock-in operation is an operation of, beginning in a state where the focal point of laser light does not rest on a target recording layer (i.e., a recording layer onto which the focal point of laser light is to be rested), ensuring that focal point of laser light rests on the target recording layer. In this example, the target recording layer is a reference layer of the optical disk medium 20. A state where the focal point of laser light does not rest on the target recording layer means a state where the target recording layer and the focal point of laser light are so distant that focusing control between the target recording layer and the laser light cannot be maintained. A state where the focal point of laser light rests on the target recording layer means a state where the target recording layer and the focal point of laser light are close enough so that focusing control between the target recording layer and the laser light can be maintained.

Referring to FIG. 3, when the optical disk medium 20 is mounted in the optical disk apparatus 100, the control circuit 101 drives the lens actuator 7 so as to move the objective lens 6 in a direction away from the optical disk medium 20 (steps 301 to 302). Next, the control circuit 101 rotates the optical disk medium 20, and activates the laser light sources 1A to 1C (steps 303 to 304). The type of the mounted optical disk medium 20 is BD, DVD, or CD. Since the base thickness and suitable laser light wavelength differ depending on the type of the optical disk medium 20, the optimum wavefront pattern for correcting the aberration also differs depending on the type of the optical disk medium 20.

Now, assume that the laser light 1a is suitable for BDs; the laser light 1b is suitable for DVDs; and the laser light 1c is suitable for CDs. Moreover, assume that the aberration correction section 5 sets three types of wavefront patterns A, B and C while repeatedly switching between them. Wavefront pattern A is a wavefront pattern for setting the aberration of the laser light 1a so that an aberration to occur when the focal point of the laser light 1a rests on a recording layer of a BD will be corrected. Wavefront pattern B is a wavefront pattern for setting the aberration of the laser light 1b so that an aberration to occur when the focal point of the laser light 1b rests on a recording layer of a DVD will be corrected. Wavefront pattern C is a wavefront pattern for setting the aberration of the laser light 1c so that an aberration to occur when the focal point of the laser light 1c rests on a recording layer of a CD will be corrected.

Thus, a state where the aberration correction section 5 has set a wavefront pattern so that an aberration to occur when the focal point of laser light rests on the recording layer of interest will be corrected will be referred to as an aberration setting state. The aberration correction section 5 repeatedly switches between a plurality of (i.e., three in this case) aberration setting states. In this example, an aberration setting state refers to a state where the aberration of current laser light is set so that an aberration which is expected to occur in the future will be corrected.

In response to an instruction from the control circuit 101, the wavefront pattern generator 102 sequentially transfers driving data for generating wavefront patterns A to C to the aberration correction section 5, and begins time-division driving (step 305). Through time-division driving, aberration setting states that are optimum for the respective ones of the plurality of types of optical disk media can substantially coexist. The control circuit 101 sets the wavefront pattern switching frequency during time-division driving so as to be sufficiently higher than the control band of focus servo. A span of time during which the aberration correction section 5 sets wavefront pattern A will be referred to as duration IA; a span of time during which wavefront pattern B is set will be referred to as duration IB; and a span of time during which wavefront pattern C is set will be referred to as duration IC.

In a state where time-division driving is being performed, the control circuit 101 causes the objective lens 6 to be moved in a direction toward the optical disk medium 20 at a predetermined velocity (step 306). When the focal point of the laser light which is suitable for the mounted optical disk medium 20 has positioned on the recording layer of the optical disk medium 20, the photodetection section 10 detects an "S" signal in a duration corresponding to that laser light (step 307). The "S" signal is contained in the focus error signal. In durations other than the corresponding duration, the aberration is very large, and therefore the amplitude of the resultant "S" signal is very small even if the focal point of laser light is positioned on the recording layer. On the other hand, in the corresponding duration, an "S" signal of a predetermined magnitude or more is obtained because the aberration is corrected. Thus, a proper "S" signal is detected only in a duration in which an aberration correction state which is suitable for the mounted optical disk medium 20 is obtained.

Note that, although the optical disk apparatus 100 shown in FIG. 1A includes a single photodetector 10, a plurality of photodetectors 10 may be comprised. In this case, each of the photodetectors 10 receives reflected light corresponding to a corresponding one of the laser light 1a to 1c, and outputs an electrical signal which is in accordance with the received reflected light. In synchronization with the time-division driving (i.e., in synchronization with the timing of alternately switching between a plurality of aberration setting states), the signal detection section 103 selects an electrical signal to be used for detecting the focus error signal from among the electrical signals which are output from the plurality of photodetection sections 10, while sequentially switching between them. Thus, the signal detection section 103 is able to detect an appropriate focus error signal which is in accordance with the switching of aberration setting states.

Now, referring further to FIG. 4, the operation of detecting the "S" signal will be described more specifically. FIG. 4 is a graph showing a relationship between beam spot positions and a focus error signal, in the case where an optical disk medium having the largest base thickness is mounted. FIG. 4(*a*) shows a driving voltage of the lens actuator 7; FIG. 4(*b*) shows a focus error signal; FIG. 4(*c*) shows beam spot positions; and FIG. 4(*d*) shows wavefront patterns of the aberration correction section 5.

As the objective lens 6 is elevated, a small "S" signal 31 caused by reflection at the surface of the optical disk medium 20 is first detected. An "S" signal 31C is detected when the focal point of laser light (beam spot) is positioned on the recording layer 22C, and an "S" signal 31B is detected when the focal point of laser light is positioned on the recording layer 22B. The "S" signals 31, 31B and 31C have small amplitudes which are less than a predetermined detection level. When the focal point of laser light is positioned on the recording layer 22A, an "S" signal 31A reaching the predetermined detection level is detected. The recording layer 22A is a reference layer of the optical disk medium 20. When the "S" signal 31A is detected, the control circuit 101 turns ON the focus servo (step 308). Then, the wavefront pattern generator 102 fixes the wavefront pattern of the aberration correction section 5 to the state of the duration in which the "S" signal 31A is detected (step 309). In the example shown in FIG. 4, the aberration correction section 5 is fixed to wavefront pattern A because the "S" signal 31A is detected in duration IA. The control circuit 101 deactivates the laser light sources 1B and 1C, which do not correspond to the fixed wavefront pattern A (step 310), and completes the focus lock-in operation.

Because the "S" signal 31A reaching the predetermined detection level is detected in duration IA, the determination section 104 determines the type of the optical disk medium 20 mounted in the optical disk apparatus 100 to be BD. After the determination, the control circuit 101 proceeds to the usual tracking servo lock-in operation and data read operation (steps 311 to 312).

Note that an "S" signal reaching the predetermined detection level is detected within a detectable range of the focus error signal corresponding to the recording layer of interest. Therefore, it is necessary that every wavefront pattern is set one or more times, within this detectable range. Herein, the span of time in which all wavefront patterns are cycled through will be regarded as one period of wavefront pattern switching frequency. By taking into account the up and down motions caused by warpage of the optical disk medium 20, the switching frequency is to be set so that:

switching frequency>disk rotation frequency×disk maximum warpage amount/focus detectable range.

Thus, according to the present embodiment, a plurality of aberration setting states for correcting aberration are allowed to substantially coexist through time-division driving. Therefore, determination of the type of the optical disk medium 20 which is mounted in the optical disk apparatus 100 can be completed through a single determination operation. In an apparatus in which only one kind of aberration setting state can be set each time, if there is mounted an optical disk medium that is not suitable for the aberration setting state which has been set, another aberration setting state must further be set, and a determination operation must be performed all over again. With the optical disk apparatus 100, determination of the type of the optical disk medium 20 can be completed through a single determination operation, and therefore a boot of the apparatus can be performed very smoothly.

Embodiment 2

Figure 5:
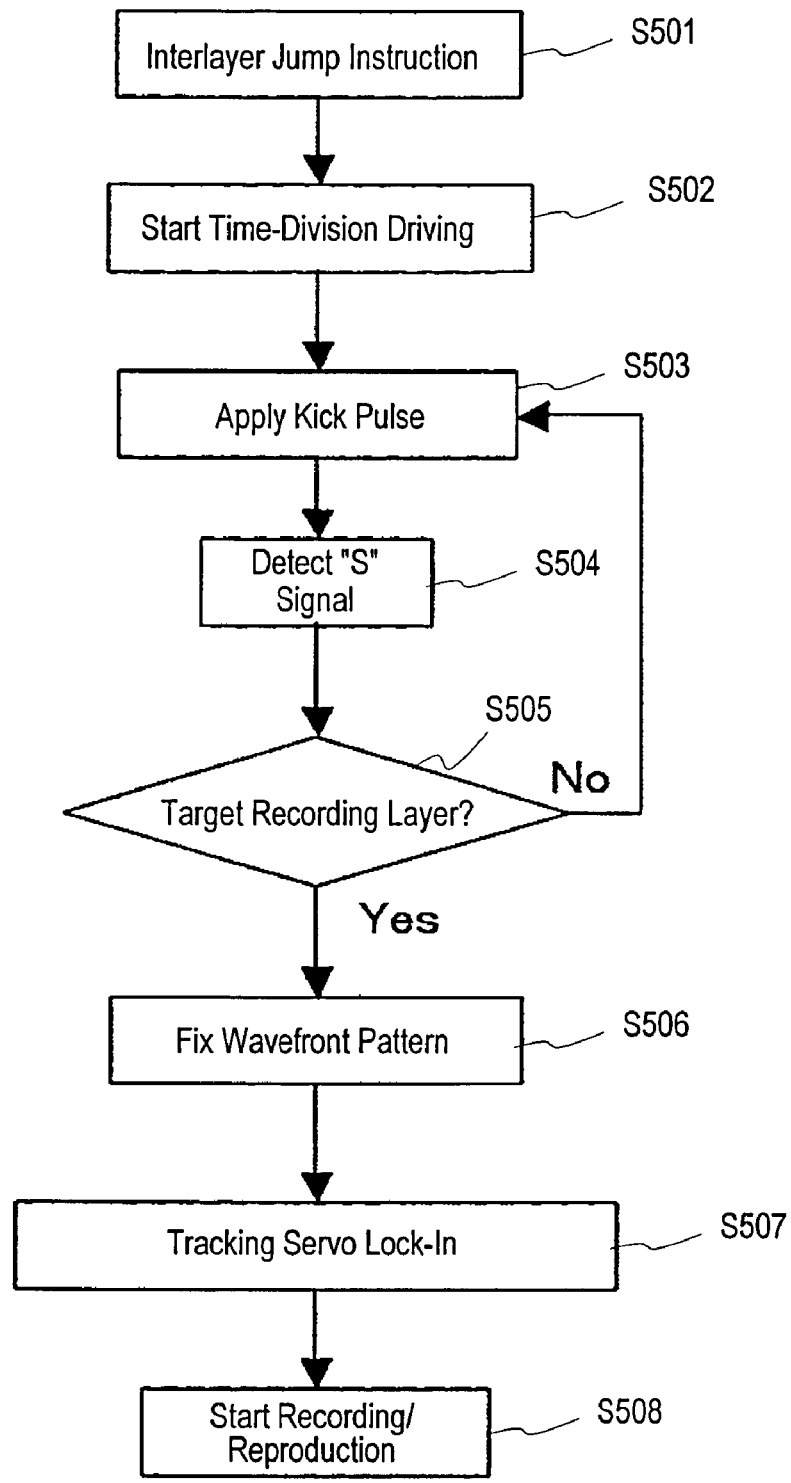
Figure 6:
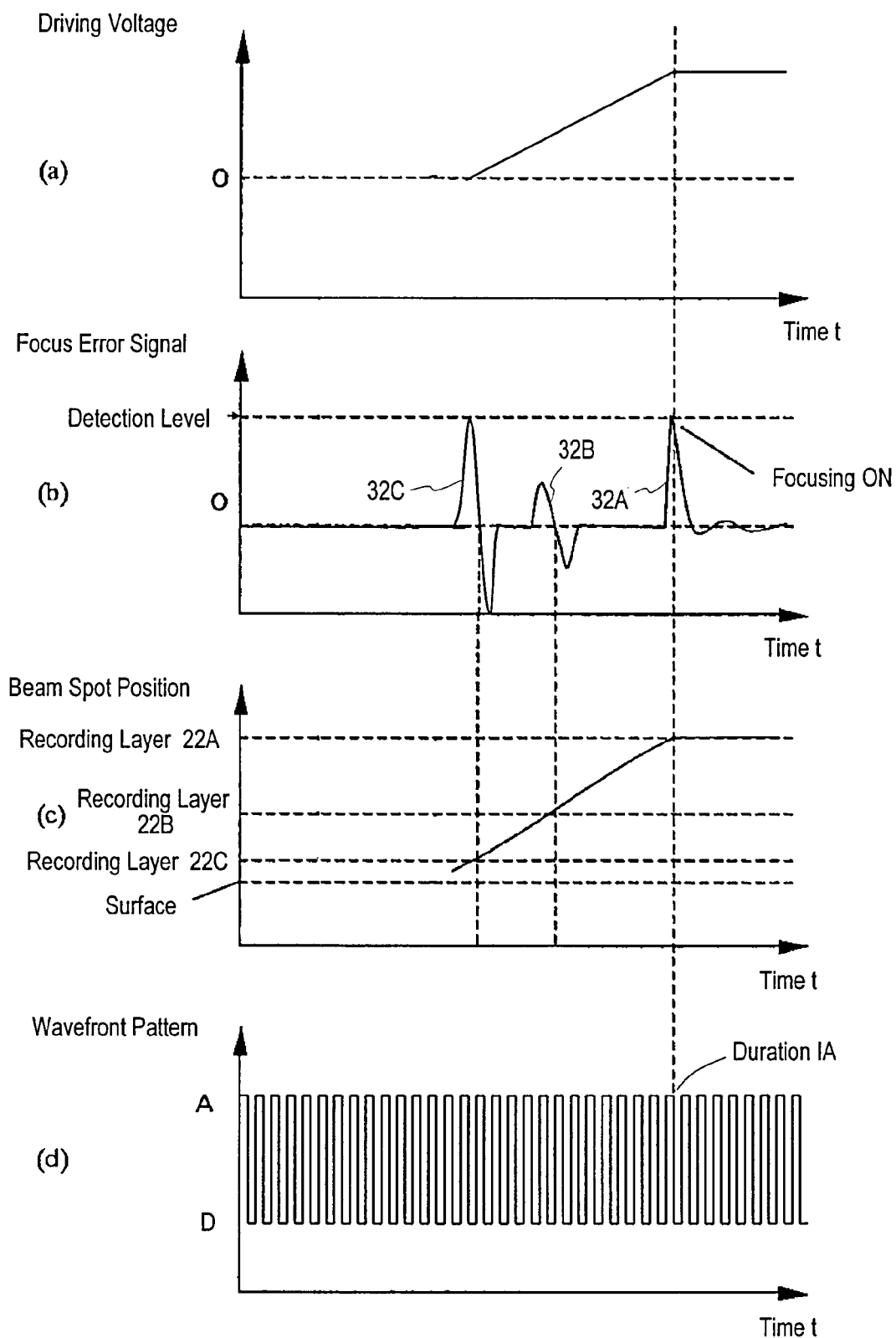

Next, with reference to FIG. 5 and FIG. 6, an interlayer jump (i.e., a move of the focal point of laser light from one recording layer to another recording layer) utilizing time-division driving will be described. FIG. 5 is a flowchart showing an interlayer jump operation according to the present embodiment. FIG. 6 is graph showing a relationship between beam spot positions and a focus error signal. FIG. 6(*a*) shows a driving voltage of the lens actuator 7; FIG. 6(*b*) shows a focus error signal; FIG. 6(*c*) shows beam spot positions; and FIG. 6(*d*) shows wavefront patterns of the aberration correction section 5.

Now, assume that the optical disk medium 20 mounted in the optical disk apparatus 100 is a BD. It is assumed that, while the focal point of the laser light 1a rests on the recording layer 22C of the BD, the aberration correction section 5 sets wavefront pattern D. The wavefront pattern D is a wavefront pattern for setting the aberration of the laser light 1a so that an aberration to occur when the focal point of the laser light 1a rests on the recording layer 22C will be corrected.

The optical disk apparatus 100 performs an interlayer jump while performing a focus lock-in operation. When an interlayer jump is performed from the recording layer 22C to the recording layer 22A (target recording layer), the wavefront pattern generator 102 drives the aberration correction section 5 so as to begin a time-division driving of alternately setting wavefront pattern D and wavefront pattern A (steps 501 to 502). Wavefront pattern A is a wavefront pattern which is suitable for the recording layer 22A. Through time-division driving, aberration setting states that are optimum for the respective ones of the plurality of recording layers can substantially coexist. A span of time during which the aberration correction section 5 sets wavefront pattern A will be referred to as duration IA; and a span of time during which wavefront pattern D is set will be referred to as duration ID. Immediately after beginning an interlayer jump, although aberration is not corrected in duration IA, wavefront patterns are switched with a frequency which is sufficiently higher than the control band of focus servo; therefore, focus servo control is maintained even after time-division driving is begun.

In this state, in order to move the focal point of laser light in the direction of the target recording layer, the control circuit 101 supplies a kick pulse to the lens actuator 7 so as to move the objective lens 6 (step 503). At this time, by moving the focal point of laser light from the recording layer 22C to the recording layer 22A while keeping the focus servo operation ON, the amount of time from when the focal point has reached the recording layer 22A until the focus lock-in operation is completed can be reduced. Even if the focus servo operation is kept ON, since the control circuit 101 recognizes that an interlayer jump is performed, no abnormality is recognized when the focal point is greatly deviated from the recording layer in the middle of the interlayer jump, and thus the interlayer jump can be continued.

When the focal point of laser light rests on the recording layer 22A, the aberration is corrected in duration IA, and an "S" signal 32A of the predetermined detection level is detected (step 504). Since the "S" signal 32A is detected in duration IA, the determination section 104 determines that the focal point of laser light has reached the recording layer 22A (step 505). Once the "S" signal 32A is detected, the aberration correction section 5 is fixed to wavefront pattern A (step 506); the focal point position of laser light is maintained on the target recording layer; and the interlayer jump is completed. The control circuit 101 proceeds to the usual tracking servo lock-in operation and data read operation (steps 507 to 508).

As in the example shown in FIG. 6, when jumping to a distant recording layer in an optical disk medium having three or more recording layers, the focal point of laser light passes through other recording layers (e.g., the recording layer 22B) before reaching the target recording layer. Since the recording layer 22B has a different base thickness from that of the target recording layer (the recording layer 22A), there is a large spherical aberration when the focal point of laser light is positioned on the recording layer 22B, and the level of the detected "S" signal 32B is low. As a result, the determination section 104 does not erroneously determine the recording layer 22B to be the recording layer 22A, and therefore the focal point of laser light passes through the recording layer 22B. Thus, even when jumping to a distant recording layer, it is possible to directly jump to the target recording layer. Therefore, the interlayer jump can be completed much more quickly than in the case where the target recording layer is reached through consecutive jumps between adjoining recording layers.

Note that, if an acceleration in the opposite direction of the jump direction is applied to the objective lens 6 due to an external force during the interlayer jump, such that the focal point of laser light is again positioned on the recording layer 22C, an "S" signal 32C reaching the predetermined detection level will be detected. In this case, however, it can be determined that the focal point of laser light is positioned on the recording layer 22C based on the "S" signal being detected in duration ID, and therefore a jump operation may immediately be retried. Thus, since the position of the objective lens 6 can be grasped even if the position of the objective lens 6 is disturbed due to an external force, the objective lens 6 will not collide with the optical disk medium 20, and a stable interlayer jump can be performed.

Note that the optical disk apparatus 100 shown in FIG. 1A includes a plurality of laser light sources 1A to 1C. However, in the case where the interlayer jump of the present embodiment is to be performed without performing disk determination, it is not necessary that a plurality of laser light sources 1A to 1C be included. In this case, the optical disk apparatus 100 may include a single laser light source which is suitable for the type of the corresponding optical disk medium.

Embodiment 3

In the present embodiment, the aberration correction section 5 is split into a plurality of regions, and the wavefront pattern generator 102 drives the aberration correction section 5 so as to set different wavefront patterns in the respective regions (hereinafter referred to as region-split driving). As a result, a plurality of aberration setting states are simultaneously set in the aberration correction section 5, so that the plurality of aberration setting states are allowed to coexist in a single optical system, by using a single aberration correction section 5.

Figure 7:
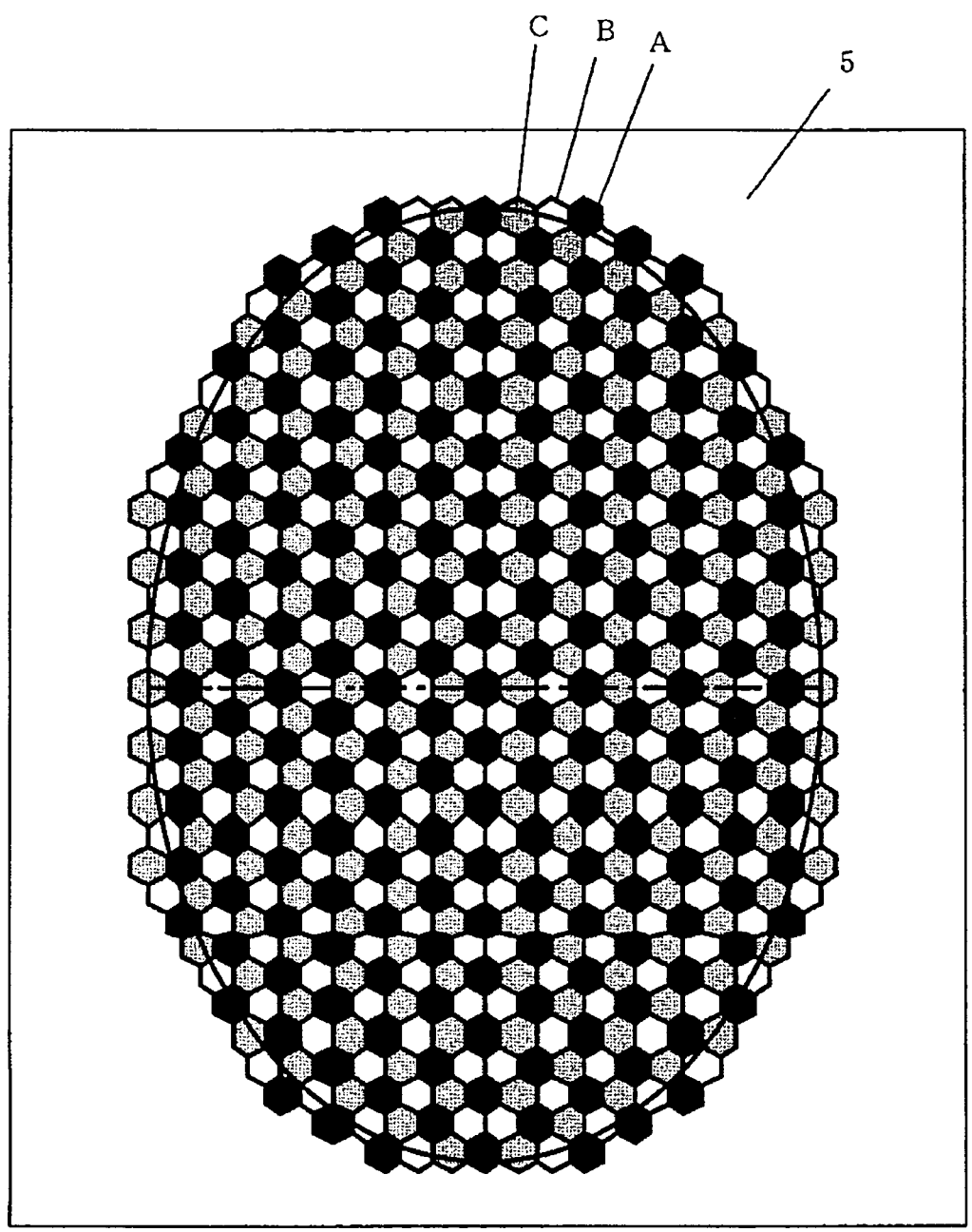

FIG. 7 shows an aberration correction section 5 which is split into a plurality of regions. Each of the plurality of hexagonal portions shown in FIG. 7 represents a light reflecting surface of a microactuator 5b. Hexagonal portions shown in black color represent light reflecting surfaces of those microactuator 5b in which wavefront pattern A is set. Hexagonal portions shown in white color represent light reflecting surfaces of those microactuator 5b in which wavefront pattern B is set. Hexagonal portion shown hatched represent the light reflecting surfaces of those microactuator 5b in which wavefront pattern C is set. Thus, the aberration correction section 5 is split into three regions.

The aberration correction section 5 is arranged in such a manner that laser light enters the micromirror array at an angle of 45°, and the light reflecting surfaces are arrayed in an $1:\sqrt{2}$ ellipse. The respective regions of the aberration correction section 5 are split in such a manner that the same wavefront pattern is formed in point symmetric positions with respect to the optical axis.

Hereinafter, an operation of disk determination which utilizes region-split driving will be described. In the region-split driving according to the present embodiment, the relationship between beam spot positions and the focus error signal is basically the same as in the relationship shown in FIG. 4(b) and FIG. 4(c).

The optical disk apparatus 100 performs disk determination while performing a focus lock-in operation. First, when the optical disk medium 20 is mounted in the optical disk apparatus 100, the control circuit 101 drives the lens actuator 7 so as to move the objective lens 6 in a direction away from the optical disk medium 20. Next, the control circuit 101 rotates the optical disk medium 20, and activates the laser light sources 1A to 1C. The type of the mounted optical disk medium 20 is BD, DVD, or CD. Since the base thickness and suitable laser light wavelength differ depending on the type of the optical disk medium 20, the optimum wavefront pattern for correcting the aberration also differs depending on the type of the optical disk medium 20. Laser light 1a and wavefront pattern A are suitable for BDs, laser light 1b and wavefront pattern B are suitable for DVDs; and laser light 1c and wavefront pattern C are suitable for CDs.

In response to an instruction from the control circuit 101, the wavefront pattern generator 102 transfers driving data for generating wavefront patterns A to C to the aberration correction section 5, and subjects the aberration correction section 5 to region-split driving.

The laser light 1a having been reflected from those mirror regions in which wavefront pattern A is set is adjusted so that an aberration to occur when the focal point of the laser light 1a rests on a recording layer of a BD will be corrected. The laser light 1b having been reflected from those mirror regions in which wavefront pattern B is set is adjusted so that an aberration to occur when the focal point of the laser light 1b rests on a recording layer of a DVD will be corrected. The laser light 1c having been reflected from those mirror regions in which wavefront pattern C is set is adjusted so that an aberration to occur when the focal point of the laser light 1c rests on a recording layer of a CD will be corrected.

In the case where the aberration correction section 5 is subjected to region-split driving, the amount of light to be received by the photodetector 10 will decrease, and therefore the servo gain is switched in accordance with the number of split regions.

In a state where region-split driving is being performed, the control circuit 101 causes the objective lens 6 to be moved in a direction toward the optical disk medium 20 at a predetermined velocity. When the focal point of the laser light which is suitable for the mounted optical disk medium 20 has positioned on the recording layer of the optical disk medium 20, the photodetection section 10 detects an "S" signal in a duration corresponding to that laser light. In durations other than the corresponding duration, the aberration is very large, and therefore the amplitude of the resultant "S" signal is very small even if the focal point of laser light is positioned on the recording layer. On the other hand, in the corresponding duration, an "S" signal of a predetermined magnitude or more is obtained because the aberration is corrected.

The position of the objective lens 6 when an "S" signal of the predetermined magnitude or more is detected differs depending on the type of the optical disk medium 20. Therefore, by relying on the driving voltage level of the lens actuator 7 to determine the position of the objective lens 6 when an "S" signal of the predetermined magnitude or more is detected, the control circuit 101 and the determination section 104 can determine the type of the mounted optical disk medium 20.

Once the type of the optical disk medium 20 is determined, the wavefront pattern generator 102 sets the entire aberration correction section 5 to the wavefront pattern which is suitable for the determined type of the optical disk medium 20. As a result, the plurality of aberration setting states which were being simultaneously set are changed to the one most-suitable aberration setting state. The control circuit 101 deactivates the non-suitable laser light sources, and appropriately sets the servo gain and turns the focus servo ON, whereby the focal point position of laser light is maintained on the target recording layer (i.e., the recording layer 22A as the reference layer). Thereafter, control proceeds to the usual tracking servo lock-in and data read.

Note that, although the optical disk apparatus 100 shown in FIG. 1A includes a single photodetector 10, a plurality of photodetectors 10 may be comprised. In this case, each of the photodetectors 10 outputs an electrical signal when receiving light of the wavelength range of a corresponding one of the laser light 1a to 1c. As a result, based on in which photodetector 10 an "S" signal of the predetermined magnitude or more has been detected, the control circuit 101 and the determination section 104 can immediately determine the type of the optical disk medium 20.

Thus, according to the present embodiment, a plurality of aberration setting states for correcting aberration are allowed to coexist through region-split driving. Therefore, determination of the type of the optical disk medium 20 which is mounted in the optical disk apparatus 100 can be completed through a single determination operation. In an apparatus in which only one kind of aberration setting state can be set each time, if there is mounted an optical disk medium that is not suitable for the aberration setting state which has been set, another aberration setting state must further be set, and a determination operation must be performed all over again. With the optical disk apparatus 100, determination of the type of the optical disk medium 20 can be completed through a single determination operation, and therefore a boot of the apparatus can be performed very smoothly.

Embodiment 4

Next, an interlayer jump utilizing region-split driving will be described.

Figure 8:
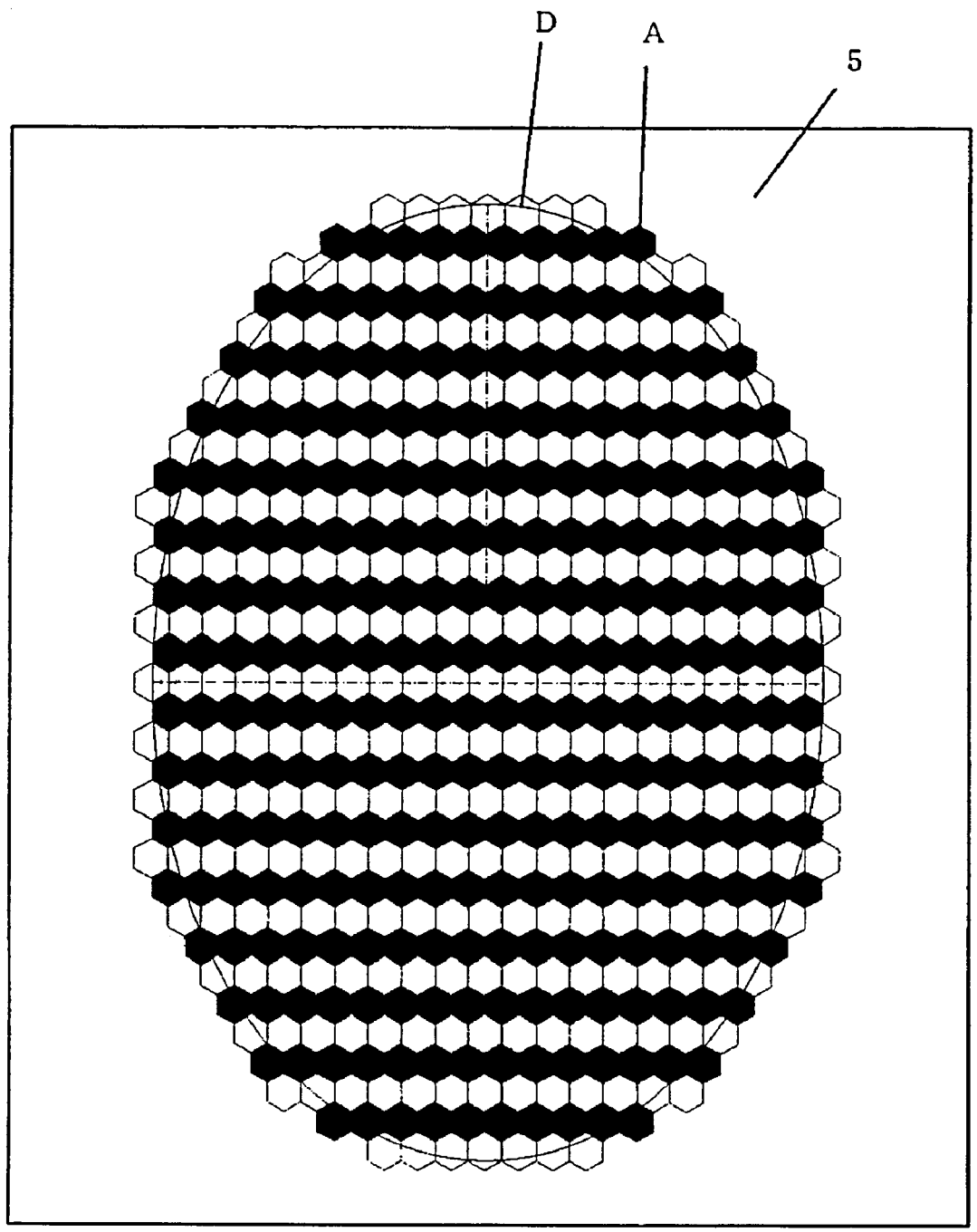
Figure 9:
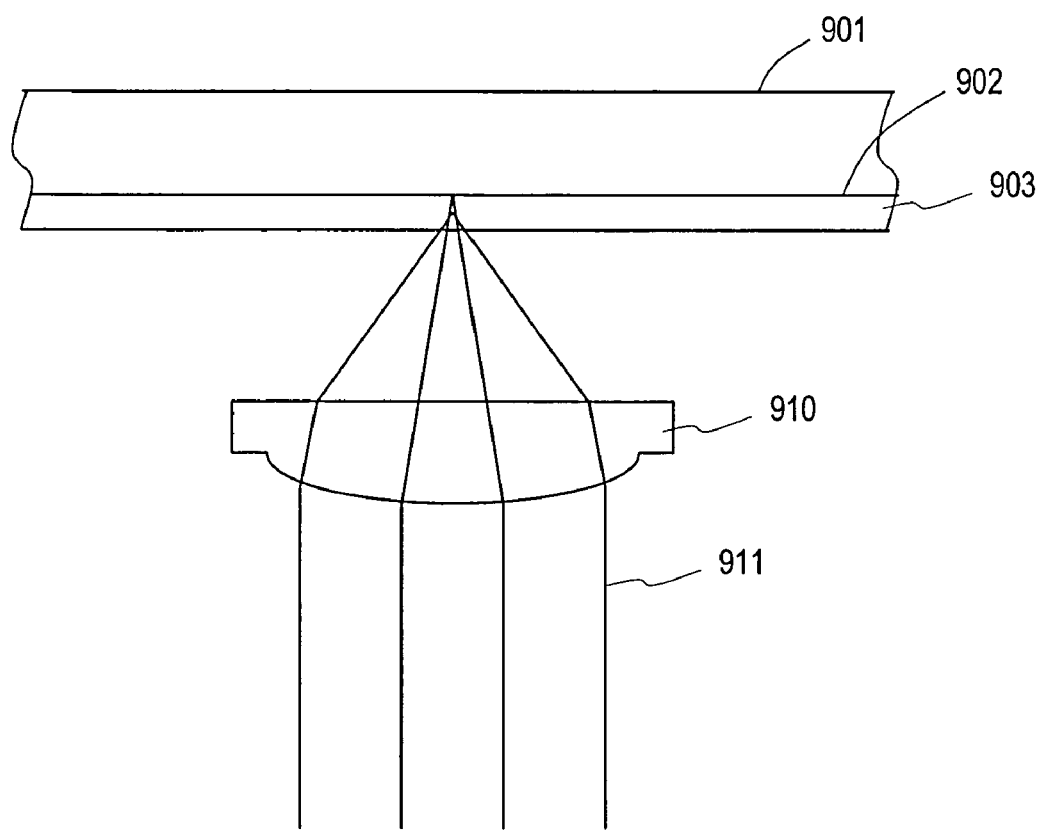

FIG. 8 shows an aberration correction section 5 which is split into two regions.

Each of a plurality of hexagons shown in FIG. 8 represents a light reflecting surface of a microactuator 5b.

Now, assume that the optical disk medium 20 mounted in the optical disk apparatus 100 is a BD. In FIG. 8, hexagonal portions shown in black represent light reflecting surfaces of those microactuators 5b in which wavefront pattern A is set. Wavefront pattern A is a wavefront pattern for correcting an aberration to occur when the focal point of laser light 1a rests on the recording layer 22A. Hexagonal portions shown in white represent light reflecting surfaces of those microactuators 5b in which wavefront pattern D is set. Wavefront pattern D is a wavefront pattern for correcting an aberration to occur when the focal point of laser light 1a rests on the recording layer 22C.

Hereinafter, an operation of performing an interlayer jump by utilizing region-split driving will be described. In the region-split driving according to the present embodiment, the relationship between beam spot positions and the focus error signal is basically the same as in the relationship shown in FIG. 6(b) and FIG. 6(c).

The optical disk apparatus 100 performs an interlayer jump while performing a focus lock-in operation. First, while the focal point of the laser light 1a rests on the recording layer 22C of the optical disk medium 20, the aberration correction section 5 sets wavefront pattern D. When making an interlayer jump from the recording layer 22C to the recording layer 22A (target recording layer), upon receiving an instruction from the control circuit 101, the wavefront pattern generator 102 transfers driving data for generating wavefront patterns A and D to the aberration correction section 5, and subjects the aberration correction section 5 to region-split driving. The aberration correction section 5 is split into regions as shown in FIG. 8. In the case where the aberration correction section 5 is subjected to region-split driving, the amount of light to be received by the photodetector 10 will decrease, and therefore the servo gain is switched to maintain focus servo.

In this state, in order to move the focal point of laser light in the direction of the target recording layer, the control circuit 101 supplies a kick pulse to the lens actuator 7 so as to move the objective lens 6. At this time, by moving the focal point of laser light from the recording layer 22C to the recording layer 22A while keeping the focus servo operation ON, the amount of time from when the focal point has reached the recording layer 22A until the focus lock-in operation is completed can be reduced.

When the focal point of laser light which has struck the light reflecting surfaces of wavefront pattern A rests on the recording layer 22A, the aberration of that laser light is corrected, and an "S" signal 32A of the predetermined detection level is detected. When the "S" signal 32A is detected, the entire aberration correction section 5 is set to wavefront pattern A. As a result, the plurality of aberration setting states which were being simultaneously set are changed to the one most-suitable aberration setting state. The control circuit 101 appropriately sets the servo gain, whereby the focal point position of laser light is maintained on the target recording layer, and the interlayer jump is completed. Thereafter, control proceeds to the usual tracking servo lock-in operation and data read operation.

When jumping to a distant recording layer in an optical disk medium having three or more recording layers, the focal point of laser light passes through other recording layers (e.g., the recording layer 22B) before reaching the target recording layer. Since the recording layer 22B has a different base thickness from that of the target recording layer (the recording layer 22A), there is a large spherical aberration when the focal point of laser light is positioned on the recording layer 22B, and the level of the detected "S" signal 32B is low. As a result, the determination section 104 does not erroneously determine the recording layer 22B to be the recording layer 22A, and therefore the focal point of laser light passes through the recording layer 22B. Thus, even when jumping to a distant recording layer, it is possible to directly jump to the target recording layer. Therefore, the interlayer jump can be completed much more quickly than in the case where the target recording layer is reached through consecutive jumps between adjoining recording layers.

Note that, if an acceleration in the opposite direction of the jump direction is applied to the objective lens 6 due to an external force during the interlayer jump, such that the focal point of laser light is again positioned on the recording layer 22C, an "S" signal 32C reaching the predetermined detection level will be detected. In this case, however, it can be determined that the focal point of laser light is positioned on the recording layer 22C by reading an address after the focus lock-in operation, and therefore a jump operation may immediately be retried. Thus, since the position of the objective lens 6 can be grasped even if the position of the objective lens 6 is disturbed due to an external force, the objective lens 6 will not collide with the optical disk medium 20, and a stable interlayer jump can be performed.

Note that the optical disk apparatus 100 shown in FIG. 1A includes a plurality of laser light sources 1A to 1C. However, in the case where the interlayer jump of the present embodiment is to be performed without performing disk determination, it is not necessary that a plurality of laser light sources 1A to 1C be included. In this case, the optical disk apparatus 100 may include a single laser light source which is suitable for the type of the corresponding optical disk medium.

Note that the region splitting patterns for the aberration correction section 5 shown in FIG. 7 and FIG. 8 are exemplary, and not limiting. They may be arranged arbitrarily, e.g., in a radial manner or in concentric circles, as long as those light reflecting surfaces in which the same wavefront pattern is set are positioned symmetrically with respect to the optical axis.

Note that the controller 140 shown in FIG. 1 can be fabricated in the form of a semiconductor chip incorporating a semiconductor integrated circuit. Moreover, the component elements of the aberration control section 130 may be integrally formed.

Moreover, at least some of the operations executed by the optical disk apparatus 100 (e.g., the operation described with reference to FIG. 3 and FIG. 4) may be realized by software. For example, the controller 140 includes a memory device for storing a program for driving the aberration correction section 5 and the like, and a CPU (CENTRAL PROCESSING UNIT) which reads that program and carries out the driving of the aberration correction section 5 and the like. These devices may be mounted in the control circuit 101. The program may be previously stored in a memory device, or installed via downloading or the like.

Although Embodiments 1 to 4 adopt a micromirror array as an aberration correction section 5 that best implements the functions of the present invention, this is not a limitation. The aberration correction section 5 may be any device that has good responsibility and allows a plurality of wavefront patterns to be set, e.g., a liquid crystal device.

INDUSTRIAL APPLICABILITY

The present invention is suitably used in the field of optical disk apparatuses which perform determination of a plurality of types of optical disk media and interlayer jumps in a multi-layered optical disk medium.

The invention claimed is:

1. An apparatus for performing at least one of data recording to an optical disk medium and data reproduction from the optical disk medium, comprising:
    a light emission section for emitting laser light;
    an optical system for irradiating the optical disk medium with the laser light; and
    an aberration control section for controlling aberration of the laser light, wherein,
    the aberration control section repeatedly switches between a plurality of aberration setting states in a focus lock-in operation,
    wherein the optical system includes an objective lens; and
    the aberration control section alternately switches between the plurality of aberration setting states with a frequency which is higher than a focus control band of the objective lens.

2. The apparatus of claim 1, wherein,
    the plurality of aberration setting states include a first aberration setting state and a second aberration setting state;
    the optical disk medium includes a first recording layer and a second recording layer; and
    the first aberration setting state corresponds to the first recording layer, and the second aberration setting state corresponds to the second recording layer.

3. The apparatus of claim 2, wherein,
    the first aberration setting state is a state where an aberration to occur when the focal point of laser light rests on the first recording layer is corrected; and
    the second aberration setting state is a state where an aberration to occur when the focal point of laser light rests on the second recording layer is corrected.

4. The apparatus of claim 2, wherein,
    the apparatus further comprises an actuator for driving the objective lens; and with a focus servo operation being kept ON, the actuator moves the focal point of laser light position from the first recording layer to the second recording layer.

5. The apparatus of claim 1, wherein,
the aberration control section includes:
an aberration correction section for correcting aberration of the laser light; and
a controller for controlling the aberration correction section, wherein,
the controller corrects the aberration by controlling the aberration correction section so as to reduce the aberration.

6. The apparatus of claim 5, wherein,
the aberration correction section is a deformable mirror; and
the controller corrects the aberration by setting a shape of the deformable mirror so as to reduce the aberration.

7. The apparatus of claim 6, wherein,
the deformable mirror is a micromirror array including a plurality of microactuators each having a light reflecting surface; and
the aberration control section sets the shape of the deformable mirror by driving the plurality of microactuators.

8. An apparatus for performing at least one of data recording to an optical disk medium and data reproduction from the optical disk medium, comprising:
a light emission section for emitting laser light;
an optical system for irradiating the optical disk medium with the laser light; and
an aberration control section for controlling aberration of the laser light, wherein,
the aberration control section repeatedly switches between a plurality of aberration setting states in a focus lock-in operation,
wherein the apparatus is an apparatus for performing at least one of data recording to a plurality of types of optical disk media and data reproduction from the plurality of types of optical disk media;
the light emission section emits a plurality of types of laser light having different wavelengths from one another;
each of the plurality of types of laser light corresponds to one of the plurality of types of optical disk media; and
each of the plurality of aberration setting states corresponds to one of the plurality of types of laser light.

9. The apparatus of claim 8, wherein each of the plurality of aberration setting states is a state where an aberration to occur when the focal point of the corresponding laser light rests on a recording layer of a corresponding one of the plurality of types of optical disk media is corrected.

10. The apparatus of claim 8, wherein,
the optical system emits the plurality of types of laser light toward an optical disk medium which is mounted in the apparatus, and
the apparatus further comprises:
at least one photodetection section for receiving reflected light corresponding to the plurality of types of laser light and outputting an electrical signal which is in accordance with the received reflected light;
a signal detection section for detecting a focus error signal from the electrical signal; and
a determination section for, based on the focus error signal, determining a type of the optical disk medium which is mounted in the apparatus.

11. An apparatus for performing at least one of data recording to an optical disk medium and data reproduction from the optical disk medium, comprising:
a light emission section for emitting laser light;
an optical system for irradiating the optical disk medium with the laser light; and
an aberration control section for controlling aberration of the laser light, wherein,
the aberration control section repeatedly switches between a plurality of aberration setting states in a focus lock-in operation,
wherein the light emission section emits a plurality of types of laser light having different wavelengths from one another;
each of the plurality of aberration setting states corresponds to one of the plurality of types of laser light;
the apparatus further comprises a plurality of photodetection sections;
each of the plurality of photodetection sections receives reflected light corresponding to one of the plurality of types of laser light, and outputs an electrical signal which is in accordance with the received reflected light;
the apparatus further comprises a signal detection section for detecting a focus error signal from the electrical signals; and
in synchronization with a timing of alternately switching between the plurality of aberration setting states, the signal detection section switches the electrical signal to be used for detecting the focus error signal among the electrical signals which are output from the plurality of photodetection sections.

12. A controller for, when mounted in an optical disk apparatus for performing at least one of data recording to an optical disk medium and data reproduction from the optical disk medium, controlling aberration of laser light,
the optical disk apparatus including:
a light emission section for emitting the laser light;
an optical system for irradiating the optical disk medium with the laser light; and
an aberration correction section for correcting aberration of the laser light, wherein,
the controller controls the aberration correction section so as to repeatedly switch between a plurality of aberration setting states in a focus lock-in operation,
wherein the controller alternately switches between the plurality of aberration setting states with a frequency which is higher than a focus control band of an objective lens in the optical system.

13. The controller of claim 12, wherein,
the plurality of aberration setting states include a first aberration setting state and a second aberration setting state;
the optical disk medium includes a first recording layer and a second recording layer; and
the first aberration setting state corresponds to the first recording layer, and the second aberration setting state corresponds to the second recording layer.

14. The controller of claim 13, wherein,
the first aberration setting state is a state where an aberration to occur when the focal point of laser light rests on the first recording layer is corrected; and
the second aberration setting state is a state where an aberration to occur when the focal point of laser light rests on the second recording layer is corrected.

15. The controller of claim 12, wherein,
the aberration correction section includes a deformable mirror; and
the controller corrects the aberration by setting a shape of the deformable mirror so as to reduce the aberration.

16. The controller of claim 15, wherein,
the deformable mirror is a micromirror array including a plurality of microactuators each having a light reflecting surface; and
the controller sets the shape of the deformable mirror by driving the plurality of microactuators.

17. A controller for, when mounted in an optical disk apparatus for performing at least one of data recording to an optical disk medium and data reproduction from the optical disk medium, controlling aberration of laser light,
the optical disk apparatus including:
a light emission section for emitting the laser light;
an optical system for irradiating the optical disk medium with the laser light; and
an aberration correction section for correcting aberration of the laser light, wherein,
the controller controls the aberration correction section so as to repeatedly switch between a plurality of aberration setting states in a focus lock-in operation,
wherein the optical disk apparatus is an apparatus for performing at least one of data recording to a plurality of types of optical disk media and data reproduction from the plurality of types of optical disk media;
the light emission section emits a plurality of types of laser light having different wavelengths from one another;
each of the plurality of types of laser light corresponds to one of the plurality of types of optical disk media; and
each of the plurality of aberration setting states corresponds to one of the plurality of types of laser light.

18. The controller of claim 17, wherein each of the plurality of aberration setting states is a state where an aberration to occur when the focal point of the corresponding laser light rests on a recording layer of a corresponding one of the plurality of types of optical disk media is corrected.

19. The controller of claim 17, wherein,
the optical system emits the plurality of types of laser light toward an optical disk medium which is mounted in the optical disk apparatus; and
the optical disk apparatus includes at least one photodetection section for receiving reflected light corresponding to the plurality of types of laser light, and outputting an electrical signal which is in accordance with the received reflected light,
the controller comprising:
a signal detection section for detecting a focus error signal from the electrical signal; and
a determination section for, based on the focus error signal, determining a type of the optical disk medium which is mounted in the optical disk apparatus.

20. A controller for, when mounted in an optical disk apparatus for performing at least one of data recording to an optical disk medium and data reproduction from the optical disk medium, controlling aberration of laser light,
the optical disk apparatus including:
a light emission section for emitting the laser light;
an optical system for irradiating the optical disk medium with the laser light; and
an aberration correction section for correcting aberration of the laser light, wherein,
the controller controls the aberration correction section so as to repeatedly switch between a plurality of aberration setting states in a focus lock-in operation,
wherein the light emission section emits a plurality of types of laser light having different wavelength from one another;
each of the plurality of aberration setting states corresponds to one of the plurality of types of laser light;
the optical disk apparatus further includes a plurality of photodetection sections;
each of the plurality of photodetection sections receives reflected light corresponding to one of the plurality of types of laser light, and outputs an electrical signal which is in accordance with the received reflected light;
the controller comprises a signal detection section for detecting a focus error signal from the electrical signals,
in synchronization with a timing of alternately switching between the plurality of aberration setting states, the signal detection section switches the electrical signal to be used for detecting the focus error signal among the electrical signals which are output from the plurality of photodetection sections.

21. A method for, in an optical disk apparatus for performing at least one of data recording to an optical disk medium and data reproduction from the optical disk medium, controlling aberration of laser light,
the optical disk apparatus including:
a light emission section for emitting the laser light;
an optical system for irradiating the optical disk medium with the laser light; and
an aberration correction section for correcting aberration of the laser light, wherein,
the method comprises a step of controlling the aberration correction section so as to repeatedly switch between a plurality of aberration setting states in a focus lock-in operation,
wherein the focus lock-in operation is an operation of, beginning in a state where a focal point of the laser light does not rest on a target recording layer of the optical disk medium, ensuring that the focal point of the laser light rests on the target recording layer,
wherein the optical system includes an objective lens, and
the aberration control section alternately switches between the plurality of aberration setting states with a frequency which is higher than a focus control band of the objective lens.

22. A program stored on a non-transitory computer-readable medium for causing an optical disk apparatus for performing at least one of data recording to an optical disk medium and data reproduction from the optical disk medium to execute a process of controlling aberration of laser light,
the optical disk apparatus including:
a light emission section for emitting the laser light;
an optical system for irradiating the optical disk medium with the laser light; and
an aberration correction section for correcting aberration of the laser light, wherein,
the controlling process comprises a step of controlling the aberration correction section so as to repeatedly switch between a plurality of aberration setting states in a focus lock-in operation,
wherein the focus lock-in operation is an operation of, beginning in a state where a focal point of the laser light does not rest on a target recording layer of the optical disk medium, ensuring that the focal point of the laser light rests on the target recording layer,
wherein the optical system includes an objective lens, and
the aberration control section alternately switches between the plurality of aberration setting states with a frequency which is higher than a focus control band of the objective lens.

* * * * *

UNITED STATES PATENT AND TRADEMARK OFFICE
CERTIFICATE OF CORRECTION

| | | |
|---|---|---|
| PATENT NO. | : 7,872,952 B2 | Page 1 of 1 |
| APPLICATION NO. | : 11/576482 | |
| DATED | : January 18, 2011 | |
| INVENTOR(S) | : Akira Kurozuka et al. | |

It is certified that error appears in the above-identified patent and that said Letters Patent is hereby corrected as shown below:

Title Page, under "FOREIGN PATENT DOCUMENTS",
"JO 2000-155979" should read -- JP 2000-155979 --.

Signed and Sealed this
Fifth Day of July, 2011

David J. Kappos
*Director of the United States Patent and Trademark Office*